United States Patent
Suzuki

(10) Patent No.: US 7,936,823 B2
(45) Date of Patent: *May 3, 2011

(54) MOVING PICTURE ENCODING METHOD AND DECODING METHOD

(75) Inventor: Yoshinori Suzuki, Saitama (JP)

(73) Assignee: Hitach Consumer Electronics Co., Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 11/932,110

(22) Filed: Oct. 31, 2007

(65) Prior Publication Data

US 2008/0063072 A1    Mar. 13, 2008

Related U.S. Application Data

(63) Continuation of application No. 10/506,428, filed as application No. PCT/JP03/08843 on Jul. 11, 2003.

(30) Foreign Application Priority Data

Jul. 15, 2002    (JP) .................................. 2002-205001

(51) Int. Cl.
  H04B 1/66    (2006.01)
  H04N 7/12    (2006.01)
  H04N 11/02   (2006.01)
  H04N 11/04   (2006.01)

(52) U.S. Cl. ................................. 375/240.16

(58) Field of Classification Search .............. 375/240.16
See application file for complete search history.

(56) References Cited

U.S. PATENT DOCUMENTS

| | | | |
|---|---|---|---|
| 5,162,907 A | 11/1992 | Keating et al. | |
| 5,210,605 A | 5/1993 | Zaccarin et al. | |
| 5,398,068 A | 3/1995 | Liu et al. | |
| 5,467,136 A | 11/1995 | Odaka et al. | |
| 5,886,742 A * | 3/1999 | Hibi et al. ................. | 375/240.16 |
| 5,926,225 A | 7/1999 | Fukuhara et al. | |

(Continued)

FOREIGN PATENT DOCUMENTS

JP    02-134085    5/1990

(Continued)

OTHER PUBLICATIONS

Witten, et al., "Arithmetic Coding for Data Compression", Communications of the ACM, vol. 30, No. 6, Jun. 1987, pp. 520-540.

(Continued)

*Primary Examiner* — Marsha D Banks Harold
*Assistant Examiner* — Jessica Prince
(74) *Attorney, Agent, or Firm* — Antonelli, Terry, Stout & Kraus, LLP.

(57) ABSTRACT

A moving picture decoding method, which generates a predicted image using information on motion vectors and information on reference images, the moving picture decoding method having a prediction mode including a mode without motion vector decoding, including: selecting a frame(s) to be referenced to in the prediction of each prediction direction in the prediction mode from among multiple candidate reference frames; and selecting motion vector information used in the prediction mode, wherein the selecting of a motion vector information is performed based on whether candidate blocks including the block adjacent to the left side of or the upper side of a current block have a motion vector; and moving picture decoding is performed by generating the predicted image using the information on the selected reference frame and the information on the selected motion vectors in the prediction mode.

1 Claim, 23 Drawing Sheets

U.S. PATENT DOCUMENTS

| | | |
|---|---|---|
| 6,195,389 B1 | 2/2001 | Rodriguez et al. |
| 6,535,558 B1 | 3/2003 | Suzuki et al. |
| 6,983,018 B1 * | 1/2006 | Lin et al. ............... 375/240.16 |
| 7,020,196 B2 | 3/2006 | Suzuki et al. |
| 7,123,657 B2 * | 10/2006 | Brightwell et al. ...... 375/240.24 |
| 2002/0131498 A1 * | 9/2002 | Sun et al. ................. 375/240.12 |
| 2003/0123738 A1 * | 7/2003 | Frojdh et al. ................... 382/236 |
| 2003/0215014 A1 * | 11/2003 | Koto et al. ............... 375/240.16 |
| 2004/0001546 A1 | 1/2004 | Tourapis et al. |
| 2004/0028282 A1 | 2/2004 | Kato et al. |
| 2004/0136461 A1 | 7/2004 | Kondo et al. |
| 2004/0146109 A1 | 7/2004 | Kondo et al. |
| 2004/0190615 A1 | 9/2004 | Abe et al. |
| 2004/0247031 A1 * | 12/2004 | Hagai et al. ............... 375/240.16 |
| 2005/0036759 A1 | 2/2005 | Lin et al. |
| 2006/0093038 A1 * | 5/2006 | Boyce ....................... 375/240.16 |
| 2008/0063075 A1 * | 3/2008 | Kondo et al. ............ 375/240.16 |

FOREIGN PATENT DOCUMENTS

| | | |
|---|---|---|
| JP | 03-217185 | 9/1991 |
| JP | 05-336510 | 12/1993 |
| JP | 11-075191 | 3/1999 |
| JP | 2004-48711 | 2/2004 |
| JP | 2004-208259 | 7/2004 |
| WO | WO 01/33864 | 5/2001 |
| WO | WO-0133864 A1 * | 10/2001 |

OTHER PUBLICATIONS

U.S. Appl. No. 60/378,954, filed May 10, 2002, Kadono et al.
U.S. Appl. No. 60/378,643, filed May 9, 2002, Kadono et al.
Joint Video Team (JVT) of ISO/IEC MPEG & ITU-VCEG (ISO/IEC JTC1/SC29/WG11 and ITU-T SC16 Q.6, 4$^{th}$ meeting; Klagenfurt, Austria, Jul. 22-26, 2002, Yoshinori Suzuki.

* cited by examiner

FIG.3   PRIOR ART
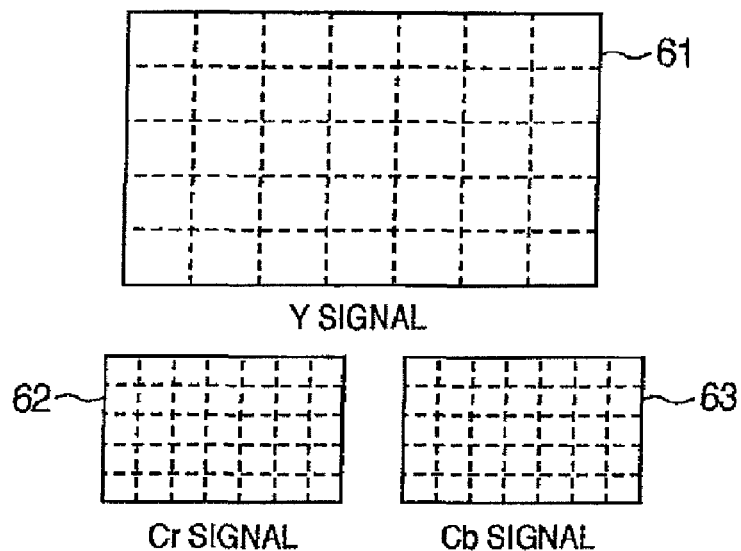
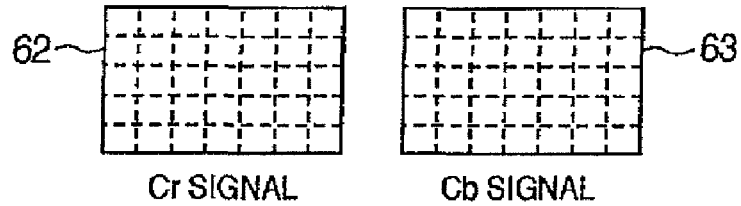
FIG.4   PRIOR ART
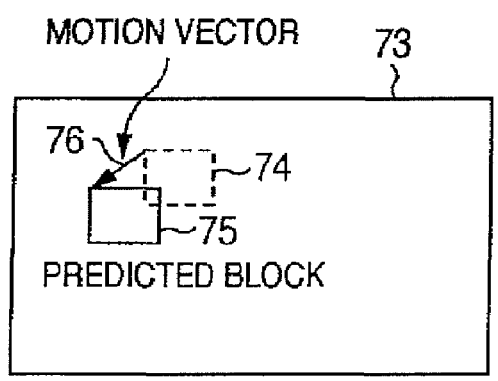
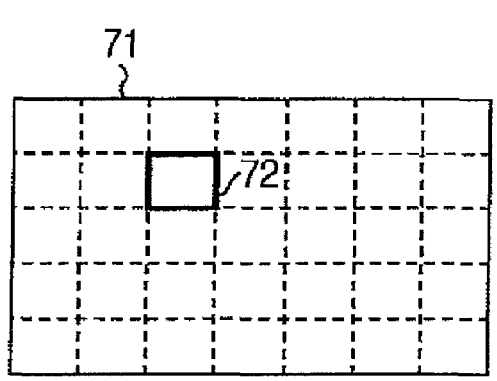

FIG.5  PRIOR ART
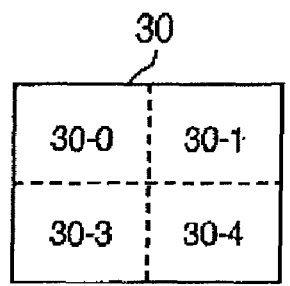
Y SIGNAL BLOCK
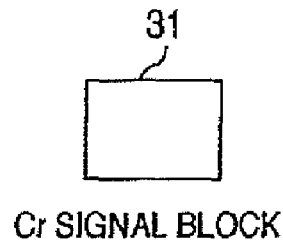
Cr SIGNAL BLOCK
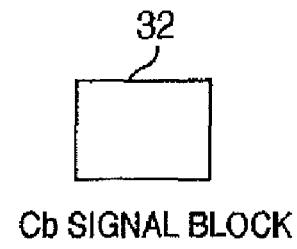
Cb SIGNAL BLOCK
FIG.6
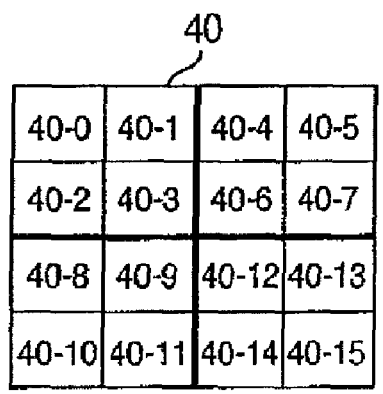
Y SIGNAL BLOCK
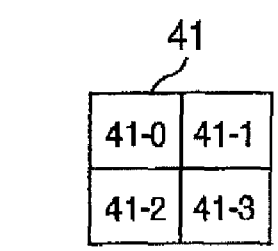
Cr SIGNAL BLOCK
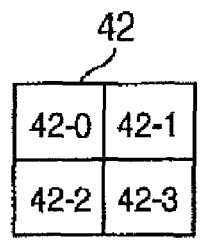
Cb SIGNAL BLOCK

FIG.7   PRIOR ART
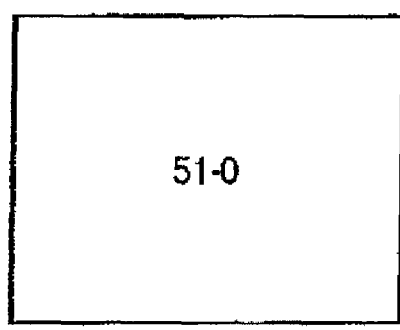
Mode 1 (16×16)
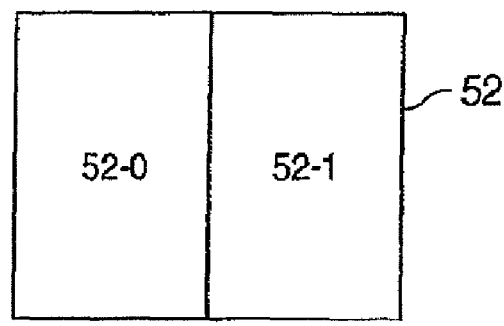
Mode 2 (16×8)
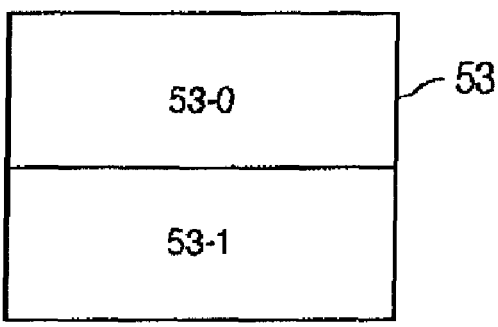
Mode 3 (8×16)
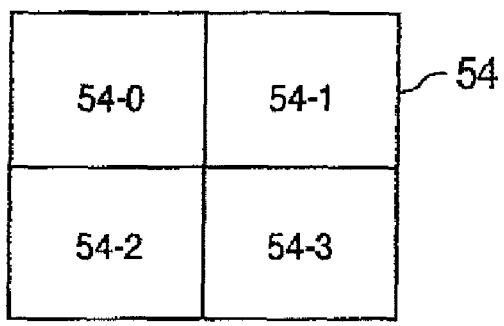
Mode 4 (8×8)
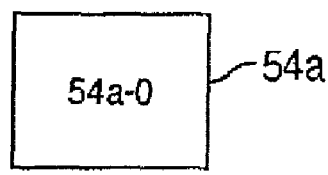
8x8 Partition 1 (8×8)
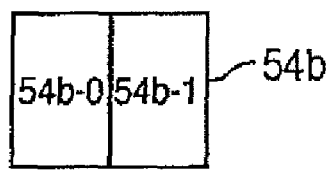
8x8 Partition 2 (8×4)
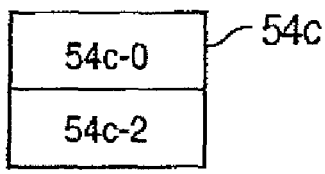
8x8 Partition 3 (4×8)
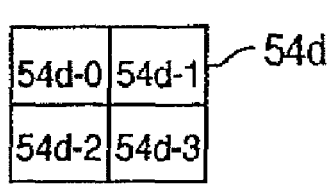
8x8 Partition 4 (4×4)

$MV_F = direct\_mv\_scale\_fwd \cdot MV/direct\_mv\_scale\_divider$ $MV_B = direct\_mv\_scale\_bwd \cdot MV/direct\_mv\_scale\_divider$ $MV_2 = picture\_distance2 \cdot MV_1 / picture\_distance1 + DMV$

| Code_number | Codewords in explicit form |
|---|---|
| 0 | 0 |
| 1 | 001 |
| 2 | 011 |
| 3 | 00001 |
| 4 | 00011 |
| 5 | 01001 |
| 6 | 01011 |
| 7 | 0000001 |
| 8 | 0000011 |
| 9 | 0001001 |
| 10 | 0001011 |
| 11 | 0100001 |
| …… | ……………… |

| Code_number | Macroblock mode | Binarization |
|---|---|---|
| 0 | SKIP | 0 |
| 1 | 16×16 | 1000 |
| 2 | 16×8 | 1011 |
| 3 | 8×16 | 1010 |
| 4 | 8×8 (split) | 1001 |
| 5 (UVLC only) | 8×8 (split,all ref=0) | - |
| 6 | Intra 4×4 | 110 |
| 7 …… | Intra 16×16 | 111 |

92

| Code_number | 8×8 Partition mode | Binarization |
|---|---|---|
| 0 | 8×8 | 1 |
| 1 | 8×4 | 000 |
| 2 | 4×8 | 0011 |
| 3 | 4×4 | 0010 |
| 4 | Intra | 01 |

| Code_number | Macroblock mode | Block 1 | Block 2 | Binarization |
|---|---|---|---|---|
| 0 | Direct (CBP==0) | - | - | 0 |
| 1 | Direct | - | - | 10 |
| 1 | 16×16 | Forward | - | 1100 |
| 2 | 16×16 | Backward | - | 1101 |
| 3 | 16×16 | Bipred | - | 1110000 |
| 4 | 16×8 | Forward | Forward | 1110001 |
| 5 | 8×16 | Forward | Forward | 1110010 |
| 6 | 16×8 | Backward | Backward | 1110011 |
| 7 | 8×16 | Backward | Backward | 1110100 |
| 8 | 16×8 | Forward | Backward | 1110101 |
| 9 | 8×16 | Forward | Backward | 1110110 |
| 10 | 16×8 | Backward | Forward | 1110111 |
| 11 | 8×16 | Backward | Forward | 1111110 |
| 12 | 16×8 | Forward | Bipred | 11110000 |
| 13 | 8×16 | Forward | Bipred | 11110001 |
| 14 | 16×8 | Backward | Bipred | 11110010 |
| 15 | 8×16 | Backward | Bipred | 11110011 |
| 16 | 16×8 | Bipred | Forward | 11110100 |
| 17 | 8×16 | Bipred | Forward | 11110101 |
| 18 | 16×8 | Bipred | Backward | 11110110 |
| 19 | 8×16 | Bipred | Backward | 11110111 |
| 20 | 16×8 | Bipred | Bipred | 11111000 |
| 21 | 8×16 | Bipred | Bipred | 11111001 |
| 22 | 8×8 (split) | | | 1111111 |
| 23 | Intra 4×4 | | | 111111010 |
| 24 ...... | Intra 16×16 | | | 111111011 |

| Code_number | 8×8 Partition mode | Prediction | Binarization |
|---|---|---|---|
| 0 | Direct | - | 0 |
| 1 | 8×8 | Forward | 10 |
| 2 | 8×8 | Backward | 1100 |
| 3 | 8×8 | Bipred | 1101 |
| 4 | 8×4 | Forward | 1110000 |
| 5 | 4×8 | Forward | 1110001 |
| 6 | 8×4 | Backward | 1110010 |
| 7 | 4×8 | Backward | 1110011 |
| 8 | 8×4 | Bipred | 1110100 |
| 9 | 4×8 | Bipred | 1110101 |
| 10 | 4×4 | Forward | 1110110 |
| 11 | 4×4 | Backward | 1110111 |
| 12 | 4×4 | Bipred | 1111110 |
| 13 | Intra | - | 1111000 |

94

MOVING PICTURE ENCODING METHOD AND DECODING METHOD

CROSS REFERENCE TO RELATED APPLICATION

This is a continuation of U.S. application Ser. No. 10/506,428, filed Mar. 9, 2005 which is a 371 of PCT/JP03/08843, filed Jul. 11, 2003. This application relates to and claims priority from Japanese Patent Application No. 2002-205001, filed on Jul. 15, 2002. The entirety of the contents and subject matter of all of the above is incorporated herein by reference.

TECHNICAL FIELD

The present invention relates to the technology of encoding and decoding compressed moving picture data, and particularly to the technology of encoding and decoding on a block basis.

BACKGROUND ART

The following explains the general outlines of a moving picture encoding/decoding method for performing encoding and decoding on a block basis.

As shown in FIG. 3, one frame of a moving picture consists of one luminance signal (Y signal 61) and two color difference signals (Cr signal 62 and Cb signal 63), and each color difference signal has an image size the length and width of which are one-half of those of the luminance signal, respectively. In the common video standards, each frame of a moving picture is divided into small blocks as shown in FIG. 3, and reproduction is made in units of blocks called macroblocks. FIG. 5 shows the structure of a macroblock. The macroblock consists of a Y signal block 30 of 16×16 pixels, and a Cr signal block 31 and a Cb signal block 31, both made of 8×8 pixels spatially matching each other.

Video coding is performed in units of macroblocks shown above. The coding methods are roughly divided into two types called intra coding (intra mode) and predictive coding (inter mode), respectively. Intra coding is a spatial data compression method which performs DCT on an input macroblock image to be encoded, or an error macroblock image that takes a difference between the input macroblock image and a predicted macroblock image created by making a spatial prediction of the input macroblock image, and performs quantization and encoding on each transform coefficient. This intra coding is applied to macroblocks (including the first coded frame) that bear no resemblance to their previous frames, or portions containing accumulated arithmetic operation errors resulting from DCT that should be resolved.

The predictive coding algorithm is called MC-DCT (Motion Compensation-Discrete Cosine Transform). Motion compensation is a compression technique for searching a reference frame for a portion similar to the contents of a target macroblock, and encoding the amount of motion (motion vector) along the time axis. Typically, the macroblock is further divided into smaller blocks so that a motion vector will be calculated for each smaller block. For example, MPEG-4 Part 10 (Advanced Video Coding) assumes macroblock partition types (luminance component) for motion compensation as shown in FIG. 7. The basics are four types 51 to 54. The type 54 is divided into four 8×8 blocks 54-0 to 54-3, and formulated to further select one partition type from five types, 54a, 54b, 54c, 54d, and intra coding, for each of the blocks 54-0 to 54-3. A motion vector in each smaller block is detected by selecting a portion in which the sum of absolute values of prediction error signals or the sum of squared errors is small in the block. The sum-of-absolute values scheme is used when the computation speed is critical, while the sum-of-squared errors scheme is used in pursuit of coding efficiency. Further, in pursuit of coding efficiency, another method may be applied, in which the amount of coding is converted to an evaluation value for the sum-of-squared errors to calculate the optimum coding mode and the amount of motion using both the prediction error and the amount of coding. FIG. 4 shows the structure of motion compensation processing for one block. FIG. 4 illustrates a predicted block 75 and a motion vector 76 on a previous frame 73 (reference frame) with respect to a luminance signal block 72 surrounded by a bold border on a current frame 71. The motion vector 76 represents the movement from a block 74 (dashed box), located spatially in the same position as the bold-bordered block on the current frame, to the predicted block region 75 on the previous frame (where the length of the motion vector for each color difference signal is one-half of that for the luminance signal, and is not encoded). After this motion compensation, DCT is performed on an error macroblock image that takes a difference between an input macroblock image and a predicted macroblock image consisting of multiple predicted blocks, and quantization and encoding are performed on each transform coefficient. The motion vector in the detected macroblock is also encoded. Since motion vectors of adjacent blocks have values close to each other, a difference value between the motion vectors of the adjacent blocks is typically encoded.

As motion compensation methods for predictive coding, there is bi-directionally predictive coding that performs MC using past and future frames as reference frames, as well as forward predictive coding that performs MC using a past frame as a reference frame. The motion compensation for forward predictive coding involves forward prediction only. On the other hand, the motion compensation for bi-directional coding includes backward prediction, bi-directional prediction, and direct prediction, as well as forward prediction. The bi-directional prediction is to perform interpolation on each pixel in the forward-predicted and backward-predicted blocks, and create interpolated predicted blocks. The direct prediction is bi-directional prediction using a motion vector from a future frame to a past frame along the time axis. In the forward, backward, or bi-directional prediction mode, a motion vector corresponding to a forward or backward motion vector or motion vectors corresponding to forward and backward motion vectors are encoded respectively. On the other hand, it is unnecessary to encode any motion vector in the direct mode. FIG. 9 shows the concept of prediction in the direct mode. As shown, a forward motion vector 132 from a block (collocated block 131) on a backward reference frame 130, the block 131 spatially corresponding to a block 121 to be predicted on a current frame 120, is reduced or divided into a forward motion vector 122 and a backward motion vector 123 at a ratio corresponding to the ratio of inter-frame distances along the time axis. Using these divided motion vectors, interpolation is performed in the same manner as in the bi-directional prediction mode.

A frame in which intra coding is applied to all the macroblocks is called an I-picture. A frame coded using forward predictive coding or intra coding is called a P-picture. A frame coded using bi-directional coding or intra coding is called a B-picture.

Although the above describes commonly used encoding and decoding methods, functions to increase the freedom of choice tend to be applied to recent encoding and decoding methods. The following describes some of new functions.

The use of these functions is also contemplated in MPEG-4 Part 10 (Advanced Video Coding).

1. Multiple Reference Frames

The above describes that one reference frame is used for motion compensation for a P-picture, and two reference frames, that is, a past frame (forward reference frame) and a future frame (backward reference frame) are used for motion compensation for a B-picture. There is also such a method to prepare multiple past frames and multiple future frames as reference frames so that a different reference frame can be selected on a macroblock basis or for each of smaller blocks into which each macroblock is divided. Further, the conventional methods use an I-picture or P-picture as a reference frame, whereas the new functions allow the selection of a B-picture as a reference frame.

2. Bi-Directional Reference Frame Prediction

When this method uses multiple reference frames, past frames can be included as possible backward reference pictures. This method also allows the backward reference pictures to be all past frames. Therefore, the term bi-predictive is used as a generic name for bi-directional. When both of two reference frames 140 and 150 are past frames or future frames, the way of coding a motion vector 127 to the reference frame 150 farther from a current frame is changed. As shown in FIG. 10, the horizontal and vertical components of a difference vector 126 between the motion vector 127 and a motion vector 125, which is calculated from a motion vector 124 to the reference frame 140 closer to the current frame 121 at a ratio corresponding to the ratio of inter-frame distances along the time axis, are coded respectively.

3. Change of Encoding/Decoding Order

The order of frame processing has conventionally complied with such a format as shown in FIG. 11 in which an I-picture and P-pictures are processed in display order, and two consecutive B-pictures arranged between two I/P-pictures are processed immediately after the backward I/P-picture on the time axis. On the other hand, the new functions are not limited to the processing order as long as the processing is done within the range of allowable display delays. When the bi-predictive concept is used, a B-picture(s) can occur even if there is no reference frame for backward prediction. Since the display order is coded as the data header of video data, or managed in sync processing between video data and audio/voice data as the upper concept of video data, a communication layer for control of dividing and distributing data, or a file format, there occurs no display misalignment resulting from a change in encoding/decoding order.

4. Frame Identification

Information indicating the display position of each frame is coded in the conventional. The display position information, however, may not match time information included in a communication packet or file format actually used for display. To avoid this problem, a method of managing each frame of video data using processing number only has been contemplated. However, in a moving picture encoding/decoding system into which the new functions are introduced, there may be no backward reference frame used in the direct mode, or a backward reference frame set by default from multiple backward reference frames may not be a future frame. Such a frame cannot adapt to the direct mode. Further, if each frame is managed by numbers in decoding order, it cannot be determined whether a backward reference frame can be utilized. In addition, when a B-picture is selected as a backward reference frame used in the direct mode, a collocated block may have no forward motion vector. Such a block cannot adapt to the direct mode.

In view of the above problems, it is an object of the present invention to provide an encoding/decoding method to which the direct mode can be applied efficiently.

DISCLOSURE OF THE INVENTION

Solution

Information indicating whether a backward reference frame set by default can be utilized in the direct mode is provided to a decoder. There is also provided a switching procedure to switch to an alternative mode applicable when a collocated block has no usable forward motion vector, and the alternative mode.

The present invention discloses a moving picture encoding/decoding method, which receives information on motion vectors, and performs motion compensation using recorded reference images and the information on the motion vectors to synthesize a predicted image, in which the motion compensation has multiple block modes including a mode without motion vector decoding. This method includes the steps of selecting a prediction mode representing the direction(s) of prediction, selecting a frame(s) to be referred to in each direction of prediction in the prediction mode from among multiple candidate reference frames, and selecting motion vector information used in the prediction mode. Among others, the selection of the prediction mode may be made based on whether blocks adjacent to a current block have a motion vector. Further, in the step of selecting a frame(s) to be referred to, one reference frame may be selected from multiple reference frames identified by index numbers. In this case, when prediction in the selected direction is applied to the multiple adjacent blocks, a reference frame used for any one of the adjacent blocks is selected, when prediction in the selected direction is applied to only one of the multiple adjacent blocks, a reference frame corresponding to the index number used for the adjacent block is selected, or when the selected prediction mode is not applied to any of the adjacent blocks, a reference frame corresponding to index number 0 is selected. Furthermore, information for defining a prediction procedure performed when the mode without motion vector decoding is selected as a block mode may be included in a header attached on a block basis.

There are also disclosed devices and the like to which the above-mentioned method is applied.

According to the present invention, a clear determination can be made as to whether the direct mode can be used or not. Further, the direct mode and its alternative mode can be used effectively, thereby increasing prediction efficiency and reducing the amount of data.

BRIEF DESCRIPTION OF THE DRAWINGS

FIG. 3 illustrates macroblock partitions.

FIG. 4 illustrates the principle of motion compensation.

FIG. 5 shows the block structure used when the presence or absence of significant DCT coefficients included in a macroblock is encoded.

FIG. 6 shows the structure of a macroblock as a unit of block for DCT and encoding.

FIG. 7 shows the structure of a luminance block as a unit of block for motion compensation.

FIG. 19 shows an example of the structure of a universal encoding table.

FIG. 20 shows an example of code tables for P-picture based on macroblock type and 8×8 block partition type, respectively.

FIG. 21 shows an example of code tables for B-picture based on the macroblock type and 8×8 block partition type, respectively.

BEST MODE FOR CARRYING OUT THE INVENTION

Embodiment 1

An embodiment will now be described using the accompanying drawings.

A flow of processing from a frame header to macroblock data will be described in order.

Figure 1:
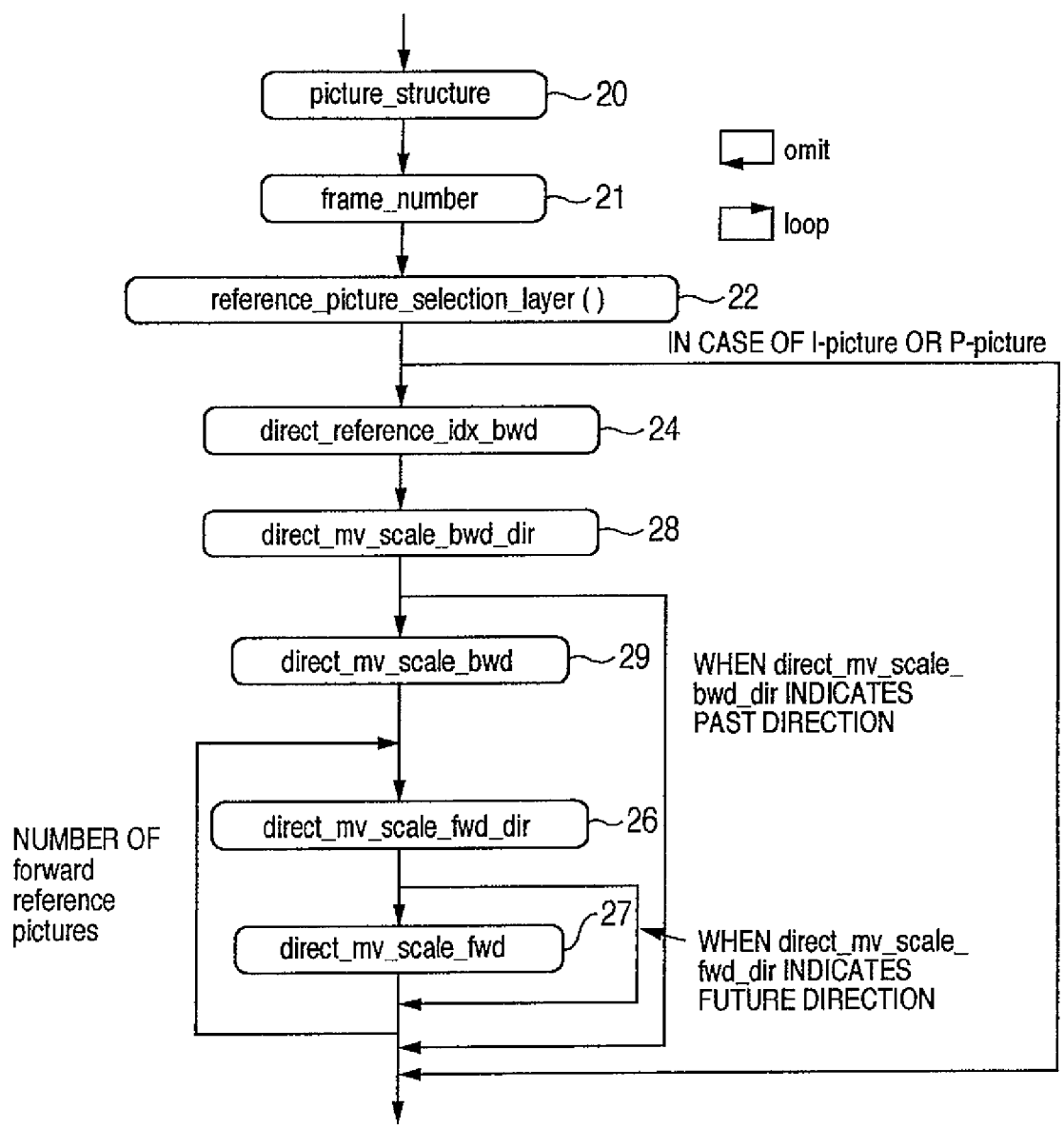
FIG. 1 shows an example of the data syntax of a picture header according to the present invention.

FIG. 1 shows an example of frame header information. The following shows an example of processing for decoding picture header data in C-language:

```
picture_layer( )
{
    picture_structure
    frame_number
    reference_picture_selection_layer( )
    if(coding_type( ) ==B-picture){
        direct_mv_scale_bwd_dir[index]
        if(direct_mv_scale_bwd_dir[index]){//future direction
            direct_mv_scale_bwd[index]
            for(index=0, index<number of forward reference; index++){
                direct_mv_scale_fwd_dir[index]
                if(direct_mv_scale_fwd_dir[index]){//past direction
                    direct_mv_scale_fwd[index]
                }
            }
        }
    }
}
```

The scanning structure (frame/field) of each picture is indicated in picture_structure 20. The identification number of the frame is specified in frame_number 21. The way of assigning the frame_number is roughly divided into two types. One is a case where time information is included. In this case, for an I- or P-picture, the frame_number is a frame distance from the previous I- or P-picture, and for a B-picture, the frame_number is a frame distance from the previous I- or P-picture in the past direction (generally called a temporal reference or TR). The other is a case where the order of decoding is simply shown.

In reference_picture_selection_layer( ), frame_number entries of multiple reference frames (reference picture set) usable for motion compensation of the current frame and their identification numbers are specified. For example, if there are five reference frames, frame_number entries to the following index 0-index 4 are assigned to the current frame of the frame number 10:

Index 0: 9
Index 1: 8
Index 2: 7
Index 3: 6
Index 4: 5

When the picture type is P-picture, the frame_number entries of the forward reference frames (forward reference picture set) are decoded, while when it is B-picture, the frame_number entries of the forward and backward reference frames (forward reference picture set and backward reference picture set) are decoded. In this case, since the number of forward reference frames and the number of backward reference frames can be set individually, they may be different from each other. If the picture type is I-picture or P-picture, the picture layer ends up with byte-align information (information for delimiting data on a byte basis) following the reference picture set information. Succeeding picture header data are included only when the picture type is B-picture. In the embodiment, it is assumed that the data are described in a layer containing high-order network/communication related information. direct_mv_scale_bwd_dir 28 is information indicating whether the back reference frame specified for the direct mode is located in the future or in the past relative to the current frame. The backward reference frame specified for the direct mode is usually a backward reference picture assigned to the index 0. If the data 28 indicates that the backward reference frame (the backward reference picture assigned to the index 0 in this case) is located in the past relative to the current frame, the direct mode cannot be used, while if the data 28 indicates that the current frame is located in the future relative to the backward reference frame, the direct mode can be used. Thus, the data 28 makes it possible to clearly determine whether the direct mode can be used for the backward reference picture of the index 0. When the direct mode cannot be performed, an alternative mode to be described later needs applying. In the process of preparing for the alternative mode, such as the arrangement of memories, the efficiency of decoding can be facilitated. Further, if the frame_number data do not include time information, information indicating the relationship between the reference picture and the current picture can be sent efficiently. Picture position information related to the direct mode includes data used in modes other than the direct mode and data that are not used in the other modes. The latter data can be prevented from being encoded in the direct_mv_scale_bwd_dir.

Figure 9:
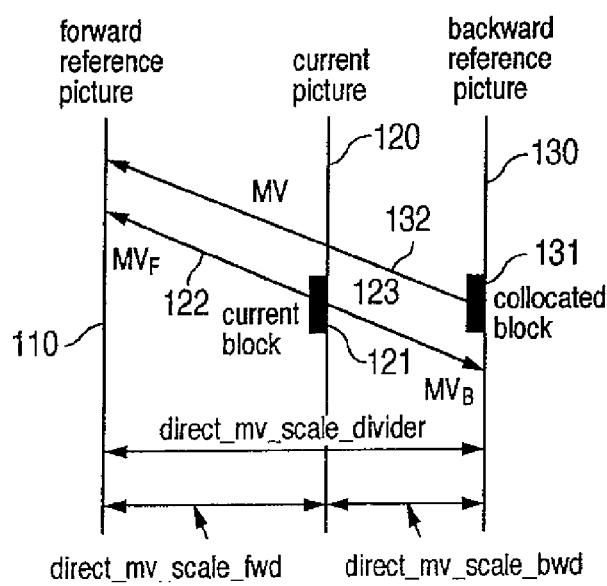
FIG. 9 shows a method of creating a motion vector for bi-directional prediction in Direct mode.

Specifically, as shown in FIG. 1, when the direct_mv_scale_bwd_dir indicates that direct mode can be used, that is, when the backward reference frame is located in the future relative to the current frame, the data 26, 27, and 29 are encoded, while when it indicates that the direct mode cannot be used, these data are not encoded. direct_mv_scale_bwd 29 is information specifying a frame distance between the current picture and the backward reference picture of the index 0 (see FIG. 9). direct_mv_scale_fwd_dir 26 is information indicating that the forward reference frame is located in the future relative to the current frame. direct_mv_scale_fwd 27 is information specifying a picture distance between the current picture and the forward reference picture (see FIG. 9). The direct_mv_scale_fwd data elements corresponding to the number of forward reference pictures specified in the reference_picture_selection_layer (22) need to be encoded. However, since any forward reference frame should be located in the past relative to the current frame, the direct_mv_scale_fwd data 27 having the indexes indicating the future direction in the direct_mv_scale_fwd_dir 26 are omitted. direct_mv_scale_divider is information specifying a picture distance between the backward reference frame of the index 0 and the forward reference picture (see FIG. 9). Therefore, although all pieces of this information corresponding to the number of forward reference pictures need to be encoded, since the information can be calculated from the direct_mv_scale_fwd and direct_reference_bwd, the encoding processing can be omitted. In this information, the direct_mv_scale_fwd data 27 having the indexes indicating the future direction in the direct_mv_scale_fwd_dir 26 are also omitted.

Even if the picture type is B-picture, the picture layer ends up with byte-align information (information for delimiting data on a byte basis).

Figure 2:
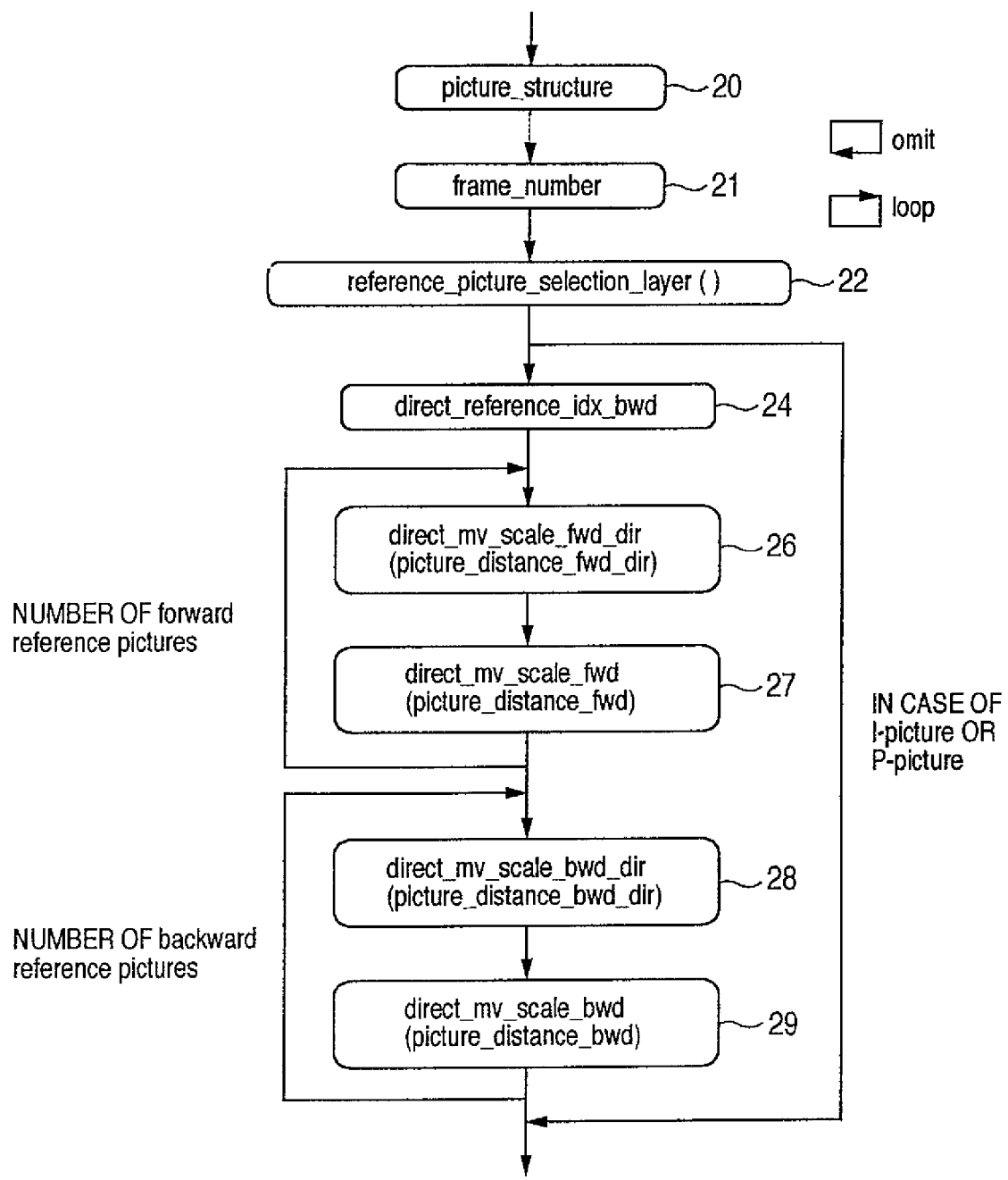
FIG. 2 shows a second example of the data syntax of the picture header according to the present invention.
Figure 10:
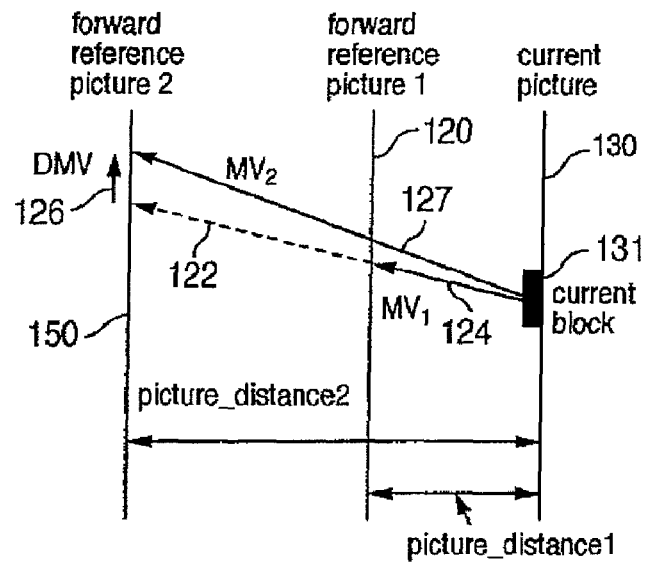
FIG. 10 shows a method of calculating a motion vector using two forward reference frames.

The direct_mv_scale_fwd and the direct_mv_scale_bwd can also be used as picture_distance shown in FIG. 10. FIG. 2 shows the following data syntax that expands the data syntax of FIG. 1 to include the motion vector encoding of FIG. 10.

```
picture_layer( )
{
    picture_structure
    frame_number
    reference_picture_selection_layer( )
    if(coding_type( )==B-picture){
        for(index=0; index<number of forward reference;
```

-continued

```
        index++){
                direct_mv_scale_fwd_dir[index]
                direct_mv_scale_fwd[index]
        }
        for(index=0; index<number of forward reference;
        index++){
                direct_mv_scale_bwd_dir[index]
                direct_mv_scale_bwd[index]
        }
    }
}
```

The following describes a case where the picture type is B-picture. In this case, although data 26 to 29 on all the reference frames usable for the current frame are encoded/decoded, these data can also be utilized as picture_distance information used for the motion vector encoding shown in FIG. 10. Like in FIG. 1, direct_mv_scale_bwd_dir[0] in FIG. 2 functions to indicate whether the direct mode can be used or not. A different point is that the combination of data 26 and 28 in FIG. 2 further indicates whether the processing of FIG. 10 can be used or not. The motion vector encoding of FIG. 10 becomes effective when two reference frames corresponding to two motion vectors are in the same direction from the current frame. Therefore, if the values of data 26 and 28 corresponding to the index numbers of the two reference pictures selected by the block are a combination of two reference frames located in different directions, they will be encoded/decoded individually by the method of FIG. 8, rather than by the motion vector encoding of FIG. 10. On the other hand, if the values of data 26 and 28 corresponding to the index numbers of the two reference pictures selected by the block are a combination of two reference frames located in the same direction from the current frame, the method of FIG. 10 will be applied to one motion vector father from the current frame.

The above describes the backward reference picture used in the direction mode has index 0, but any index number other than the index 0 may be selected from the backward reference picture set as the backward reference picture used in the direct mode. For example, when the index number of the backward reference picture used in the direct mode is specified on the picture layer, such as the direct_reference_idx_bwd 24 in FIGS. 1 and 2, the backward reference picture can be changed on a block basis. Further, if the direct_reference_idx_bwd 24 takes on values with 1 added to each index number, rather than the index number itself, the value "0" can mean that the backward reference picture set includes no backward reference picture usable in the direct mode.

Figure 11:
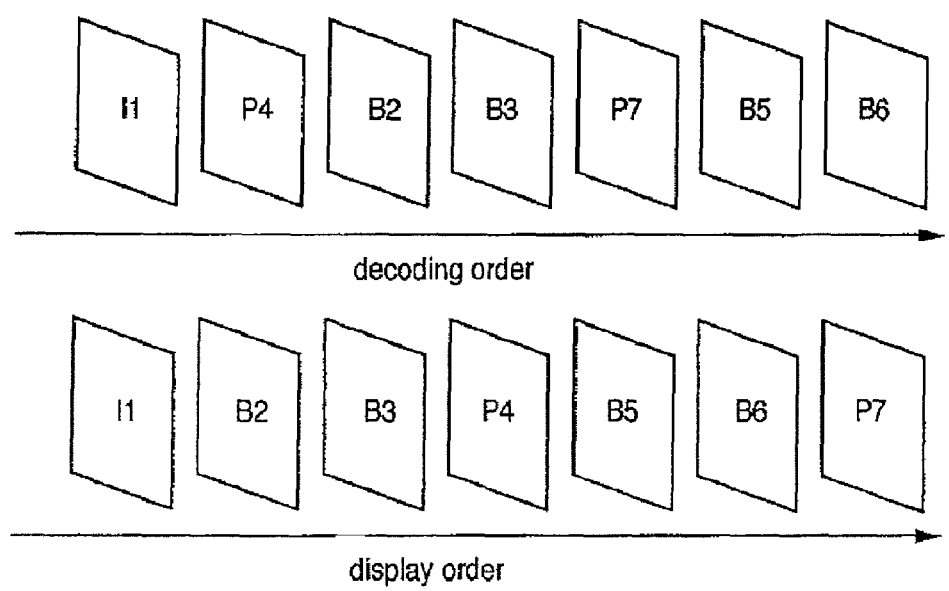
FIG. 11 shows a comparative example of decoding order and display order.

Referring next to a macroblock layer syntax in FIG. 18 and macroblock type code tables in FIGS. 20 and 21, the structure of macroblock data will be described. Some encoding methods can be adopted, such as Universal VLC (UVLC) using only one kind of variable length code table, encoding method using a combination of fixed length coding and variable length coding (with code tables for respective coding elements), and arithmetic coding (see "Arithmetic Coding for Data Compression" by Witten et. al., Comm. of the ACM, 30(6), 1987, pp. 520-541). In the embodiment, UVLC and arithmetic coding are taken as examples. A table 81 in FIG. 11 shows the structure of UVLC, where variable Xn takes either "0" or "1". A table 82 shows an actual example of the variable length code table. A specific method for arithmetic coding may be such that the meaning of each code is replaced with several bits of binary data to encode each bit according to a probabilistic model indicating the probability of occurrence of each bit (0 or 1). This method is called CABAC (Context-based Adaptive Binary Arithmetic Coding).

Figure 18:
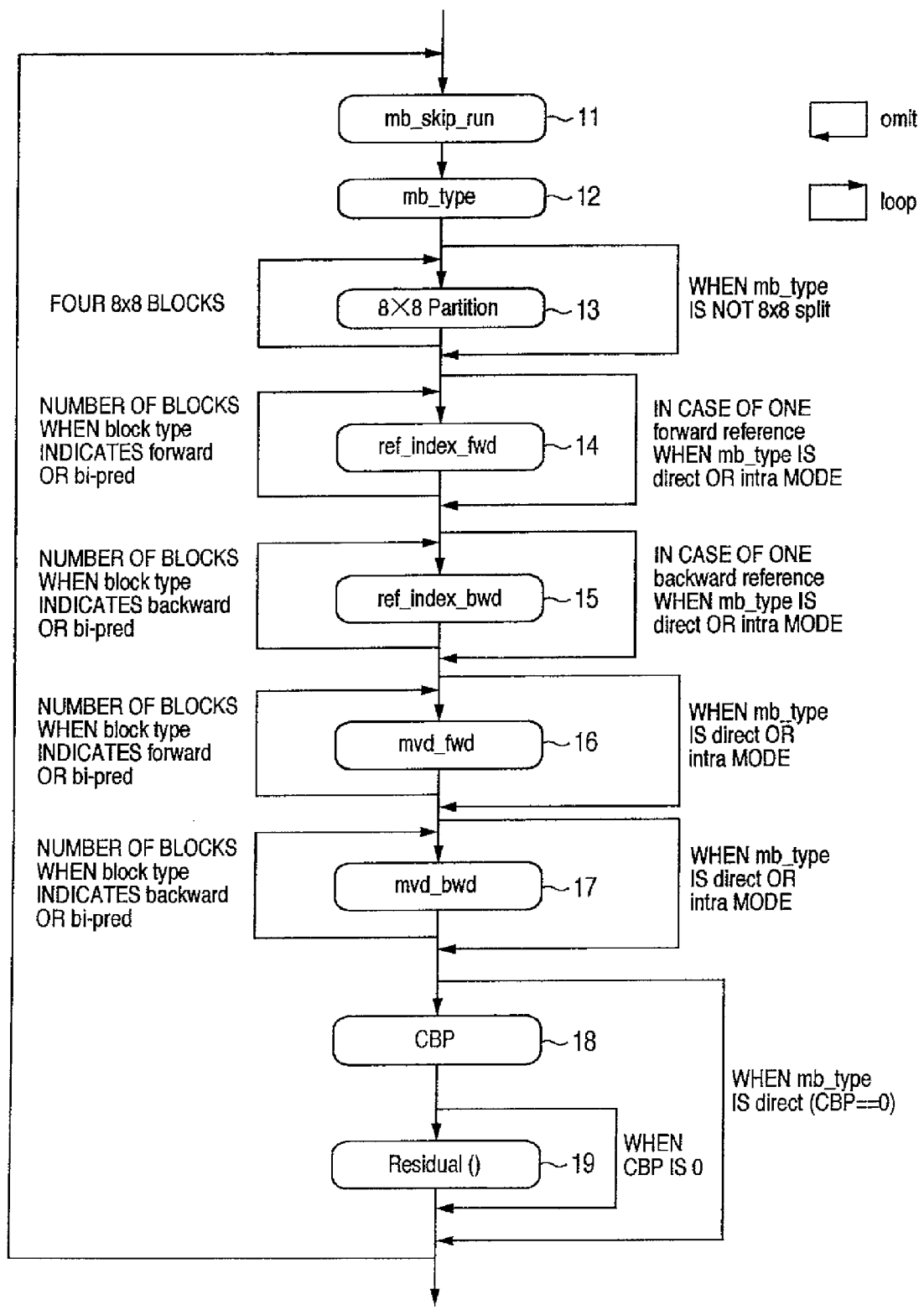
FIG. 18 shows an example of the data syntax of a prediction frame according to the present invention.

FIG. 18 shows the syntax structure of macroblock data on B-picture. Using this figure, the following describes the structure of macroblock data on B-picture. Note here that the description of data on I-picture will be omitted because it is not included in the features of the present invention.

In FIG. 18, mb_skip_run 11 is data obtained by performing run length coding on the number of consecutive SKIP modes (that is, by coding the number of consecutive 0s, where when the previous macroblock is not of SKIP mode type, the number of consecutive SKIP modes is set to zero). This data is created only when UVLC is used as an entropy coding method. The SKIP mode means the type of macroblock that uses a predicted block image as a block image to be reproduced without encoding of any prediction error signal. When the picture type is P-picture, the predicted block image is synthesized by a method for cutting out the macroblock image at a predicted vector position from the forward reference picture having the index 0, while when it is B-picture, the predicted block image is synthesized in the direct mode. This SKIP mode is often selected for low-rate coding, especially when the picture type is B-picture. Therefore, the prediction performance directly affects the low-rate coding performance. In the coding method using CABAC, the SKIP mode is handled in mb_type 12 without use of the mb_skip_run 11 (see Code_number 0 columns in the tables 91 and 93). The mb_type 12 specifies one mode selected for each macroblock from the macroblock modes as shown in the table 91 (P-picture) or the table 93 (B-picture) so that data will be encoded in the selected mode. In the table 91, N of Intra M×N shown in the records of code numbers 6, 7 indicates the smaller block size for spatial prediction, and M×N indicates the smaller block size for motion compensation (mode 1 to mode 4 in FIG. 7). The CABAC mode in the record of code number 5 does not use N×M. In the table 93, N of Intra M×N shown in the records of code numbers 23, 24 indicates the smaller block size for spatial prediction, and M×N indicates the smaller block size for motion compensation (mode 1 to mode 4 in FIG. 7). Further, Direct means the direct mode (where Direct (CBP=0) is SKIP mode under the application of CABAC). The columns Block 1 an Block 2 in the table 93 identify two smaller blocks in the mode 2 or mode 3 of FIG. 7, where the direction of prediction of each smaller block is selected from Forward (forward prediction), Backward (backward prediction), and Bi-predictive (bi-directional reference frame prediction).

Figure 12:
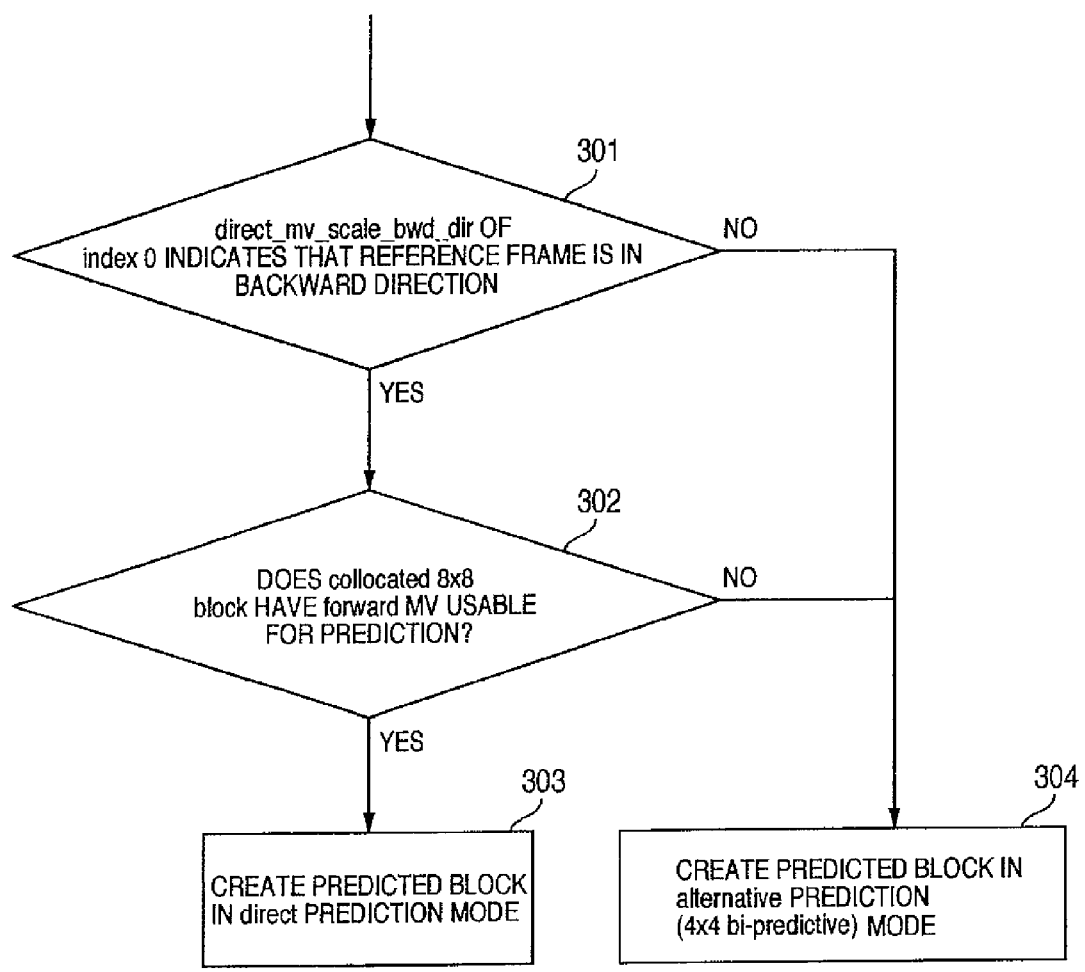
FIG. 12 shows an example of a switching procedure to switch prediction methods according to the present invention.
Figure 13:
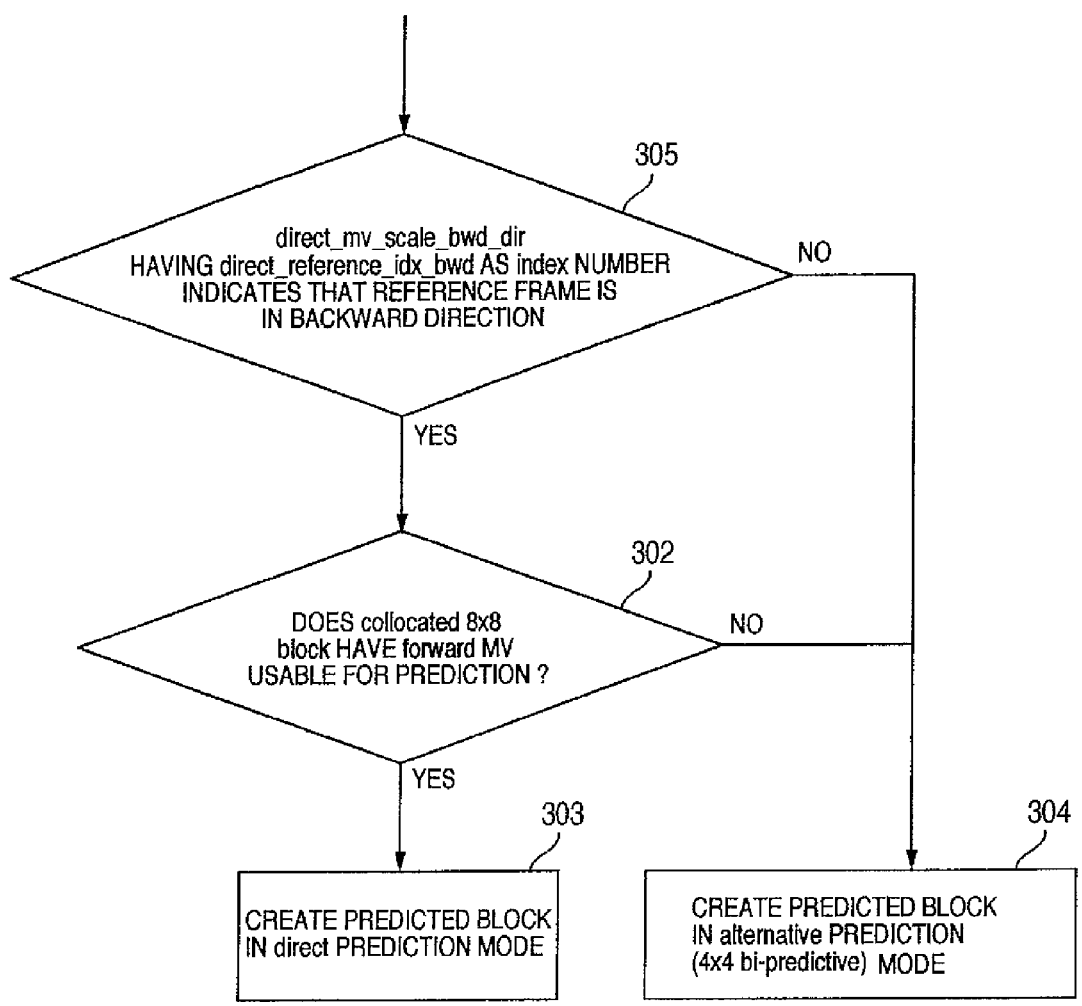
FIG. 13 shows a second example of the switching procedure to switch prediction methods according to the present invention.
Figure 14:
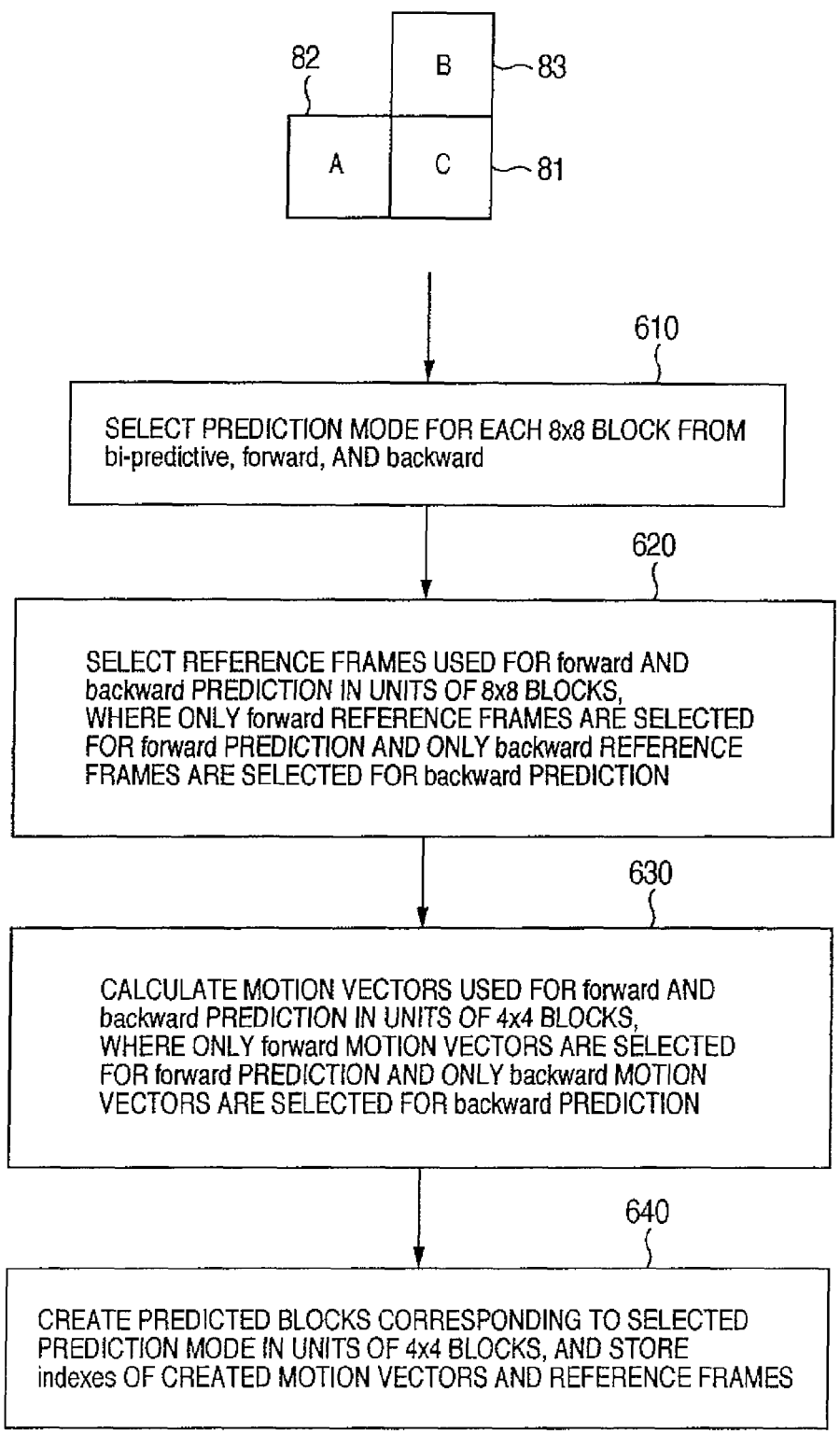
FIG. 14 shows the general structure of an alternative mode according to the present invention.

The following is additional information on the direct mode. The direct mode is one of the options of the mb_skip_run 11 and the mb_type 12, but it may not be able to be applied to a system using multiple reference frames or two references frames. Therefore, according to the present invention, a switching procedure to switch prediction methods according to the conditions is used as shown in FIG. 12. At first, direct_mv_scale_bwd_dir (FIG. 1) or direct_mv_scale_bwd_dir [0] (FIG. 2) in the picture header is checked to determine whether the direct mode can be used for the current picture (301). If it is determined in the processing step 301 that the direct mode cannot be used, a predicted macroblock is created in an alternative mode (to be described in details later) that requires no forward MV of the collocated block (304). On the other hand, if it is determined in the processing step 301 that the direct mode can be used, a prediction method is selected in units of 8×8 blocks. Here, the prediction unit is set to 8×8 block because the minimum unit of each reference frame and the selection of prediction direction is 8×8 block in the block partition method of FIG. 7. Specifically, it is checked whether a prediction mode that requires a forward MV is applied to the 8×8 collocated block (302). If it is determined that such a prediction mode is applied, a predicted block is created in the alternative mode (304). In the processing step 302, it is determined that the direct mode cannot be used when the prediction mode is the intra mode or the prediction direction of the collocated 8×8 block is backward, when the value of the direct_mv_scale_fwd_dir [index] indicates that the forward reference picture is located in the backward (future) direction from the current picture, or when the forward reference picture is not included in the forward reference picture set for the current picture. In the processing step 302 of FIG. 12, the determination that the direct mode cannot be used is made in units of 8×8 blocks, but it may also be made in units of macroblocks. In such a case, it is determined that the direct mode can be used only when the direct mode is usable for all the prediction blocks in the macroblocks, that is, all the four 8×8 blocks in the block partition method of FIG. 7. FIG. 13 shows a procedure to switch prediction methods when data 24 is added to the picture header structure. A different point from FIG. 12 is that the processing step 301 is changed to processing step 305. Specifically, the value of the data 24 is set as the index number of the direct_mv_scale_bwd_dir.

Returning to FIG. 18, when the mb_type 12 specifies 8×8 (split), the 8×8 partition data 13 is created for each of the four 8×8 smaller blocks 54-0 to 54-3 shown in the mode 4 in FIG. 7. Specifically, in the 8×8 Partition 18, one mode is selected for each 8×8 block from 8×8 partition modes shown in the table 92 (P-picture) or the table 94 (B-picture), and data is encoded in the selected mode. In the table 92, Intra in the record of code number 4 means Intra spatial prediction, and M×N indicates the smaller block size for motion compensation (8×8 partition 1 to 8×8 partition 4 in FIG. 7). In the table 94, Intra in the record of code number 13 means that the spatial prediction is applied, M×N indicates the smaller block size for motion compensation (8×8 partition 1 to 8×8 partition 4 in FIG. 7), and Direct means the direct mode. The column Prediction in the table 94 specifies the direction of prediction of each smaller block belonging to the mode 4 in FIG. 7 from Forward (forward prediction), Backward (backward prediction), and Bi-predictive (bi-directional reference frame prediction).

Even if the direct mode is selected in the 8×8 Partition, such a procedure to switch prediction methods as shown in FIG. 12 or 13 can be adapted. However, since the prediction performance of the direct mode in the 8×8 Partition is less important than the direct mode MB, the method applied can be made simpler. For example, when it is determined in the processing step 302 that the collocated block has no Forward MV, a predicted block may be created by setting the Forward MV to 0 vector, and each index number of the forward reference picture and the backward reference picture to 0, instead of the processing step 304. In this case, if there is no backward reference picture, the predicted block is created from the forward reference picture alone. Further, when it is determined in the processing step 302 that the collocated block has no Forward MV, the decoding side may not select direct mode to make the method much simpler.

In the case of UVLC, the mb_type 12 and the 8×8 Partition 13 are encoded by selecting, from the table 82, codes corresponding to the code numbers of the tables 91 to 94. In the case of CABAC, bitstreams indicated in the Binarization column of the tables 91 to 94 are arithmetically encoded using the probabilistic model for each bit.

ref_index_fwd 14 specifies the index number of the forward reference frame used for motion compensation, and this code is required for each partitioned block (51 to 54 in FIG. 7) in the macroblock. The index number is selected from the forward reference picture set, but this code is not created when the number of reference frames in the forward reference picture set is one, when the block type or macroblock type is skip, direct, or intra, or when the direction of block prediction is backward. This code is also not created when the code number 5 is selected as the mb_type from the table 91 for P-picture, because the forward reference picture of the index 0 is automatically selected as the reference frame. The following considers the encoding method by taking, as an example, a case where the forward reference picture set has index values 0 to 4. In this example, the index 0 to the index 4 are assigned to the code numbers 0 to 4, respectively. In the case of UVLC, the codes corresponding to the code numbers 0 to 4 are selected from the table 82 and encoded/decoded. In the case of CABAC, binary data 1', 01', 0001', and 00001' are assigned to the code numbers 0 to 4, respectively, and the bitstreams are arithmetically encoded using the probabilistic model for each bit.

ref_index_bwd 15 specifies the index number of the backward reference frame used for motion compensation, and this code is required for each partitioned block (51 to 54 in FIG. 7) in the macroblock. The index number is selected from the backward reference picture set, but this code is not created when the picture type is P-picture, when the number of reference frames in the backward reference picture set is one, when the block type or macroblock type is skip, direct, or intra, or when the direction of block prediction is forward. Since the encoding method is the same as the ref_index_fwd, the description will be omitted.

mvd_fwd 16 is created when the mb_type 12 and the 8×8 Partition 13 indicate that the macroblock has a motion vector(s) for forward prediction (including that in the bi-predictive mode), and repeated for the number of forward MVs in the macroblock. Therefore, this data is not created when the mb_type 12 is IntraM×N, SKIP (P-picture), or Direct (B-picture), or when the 8×8 Partition 13 is Intra or Direct (B-picture). This data is also not created when the direction of prediction of the partitioned blocks is backward (B-picture). Likewise, mvd_bwd 17 is created when the mb_type 12 and the 8×8 Partition 13 indicate that the macroblock has a motion vector(s) for backward prediction (including that in the bi-predictive mode), and repeated for the number of backward MVs in the macroblock. Therefore, this data is not created when the picture type is P-picture, when the mb_type 12 is IntraM×N or Direct, or when the 8×8 Partition 13 is Intra or Direct. This data is also not created when the direction of prediction of the partitioned blocks is forward. CBP 18 is coded data indicating whether the 24 DCT blocks shown in FIG. 6 include 16 quantized DCT coefficients other than "0" (significant coefficients). Residual( ) 19 is coded data on the significant, quantized DCT coefficients. Since the blocks with no significant coefficients indicated in the CBP are not encoded, the Residual( ) data is not created when CBP is 0. In addition, the CBP 18 and the Residual( ) 19 are not created when the mb_type 12 is direct(CBP==0).

Figure 8:
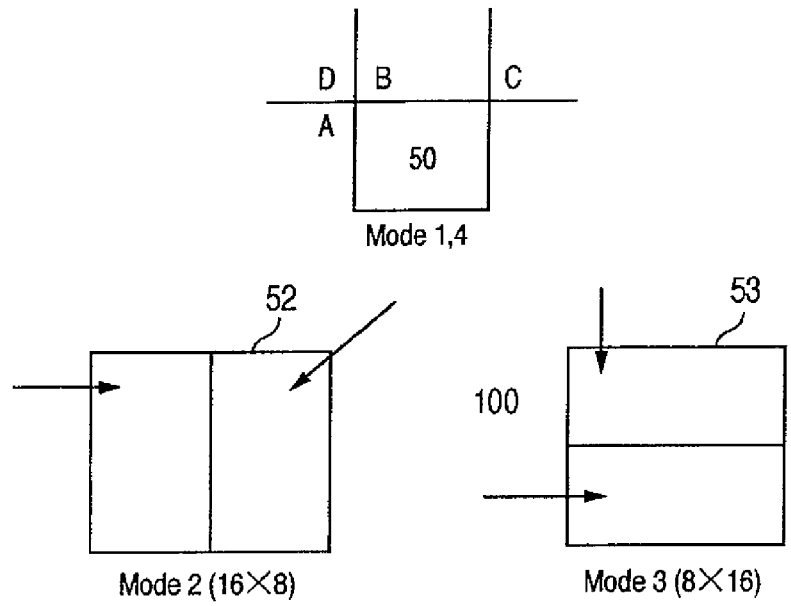
FIG. 8 illustrates means for creating a predicted motion vector.

Referring next to FIG. 8, a method of creating the above-mentioned predicted motion vectors mvd_fwd 16 and mvd_bwd 17 will be described by taking the partition types in FIG. 7 as examples. As shown in FIG. 7, the block 51-0 in the mode 1 (51), and the smaller blocks 54*a*-0, 54*b*-0 and 54*b*-1, 54*c*-0 and 54*c*-1, and 54*d*-0 to 54*d*-3 in the mode 4 use the same prediction method. Suppose here that the number of smaller blocks for which motion vectors are encoded is 50. For each of the smaller blocks, motion vectors of three adjacent blocks A, B, C are selected as candidate motion vectors, and an intermediate value of them is calculated for each of the horizontal and vertical components, thus setting the motion vector having the intermediate value as the predicted vector. The block C, however, may be uncoded block or be located outside the image because of their coding order or their position in the macroblock. In such a case, a motion vector of block D is used instead of that of the block C as one of the candidate motion vectors. Further, when the blocks A and D are located outside the image, their motion vectors are set as "0" vectors to perform prediction, while when the blocks D, B, and C are located outside the image, the motion vector of the block A is used for prediction. If two of the three candidate blocks do not have any motion vector, the remaining one candidate motion vector is set as the predicted motion vector. For each of the two blocks (52-0, 52-1) in the mode 2 and the two blocks (53-0, 53-1) in the mode 3 (53), motion vectors of blocks located at the base of each arrow in FIG. 8 are set as predicted values. In this motion vector coding method, only the motion vectors of the same reference frame(s) are used for prediction. Therefore, if the motion vectors of the adjacent blocks are different from those of the reference frame(s) selected by the block to be encoded, the adjacent blocks are identified as being outside the image. In addition, corresponding motion vectors for the color difference components are calculated by dividing the motion vector for the luminance component by 2, respectively, without encoding them.

Referring next to FIGS. 14 to 17, an alternative mode (4×4 bi-predictive) that requires no Forward MV of the collocated block will be described. The Direct mode and the Skip mode using the Direct mode for B-picture are prediction systems important to increase selection efficiency ad encoding performance. However, systems having a high degree of flexibility in the selection of reference frames and frame coding procedure such as MPEG-4 Part 10 cause frames and blocks for which the conventional Direct mode dose not function effectively. This alternative mode is switched to and used when the conventional Direct mode does not function effectively, thereby preventing prediction performance degradation, and hence increasing prediction efficiency. Further, the conventional Direct mode uses the motion vector of the reference frame, while the alternative mode uses the motion vector of the current frame. This eliminates the need to store the motion vector in a memory for later frame encoding/decoding processing, resulting in an effective reduction in memory size. In addition, since the alternative mode does not need scaling processing for the motion vector, decoding processing can be made simpler. The prediction procedure of the alternative mode is made up of four parts shown in FIG. 14. At first, the direction of prediction is selected from bi-predictive, forward, and backward in units of 8×8 blocks (610). This selection is made using a target 8×8 block C 81, a block B 83 directly above the block C 81, and a block A 82 directly on the left of the block C 81. Then, a reference frame(s) necessary to perform the prediction mode selected in the processing step 610 is selected (620). This selection is made using the target block B 83 directly above the block C 81, and the block A 82 directly on the left of the block C 81. Next, a motion vector(s) corresponding to the selected prediction mode and the reference frame(s) is calculated in units of 4×4 blocks (630). Finally, 4×4 predicted blocks are synthesized based on the prediction mode and the reference frame(s) selected at the processing steps 610 and 620, and the motion vector(s) calculated at the processing step 630, and the indexes of the calculated motion vector(s) and the reference frame(s) are stored for motion vector prediction (640). Since element data necessary for prediction processing are predicted from surrounding blocks in the same frame, so that a localized motion can be predicted, thereby enhancing prediction efficiency. Further, since the alternative mode uses only the data on the adjacent blocks in the frame, the total amount of data to be stored to perform the alternative mode can be reduced. The following illustrates the details of this processing.

Figure 15:
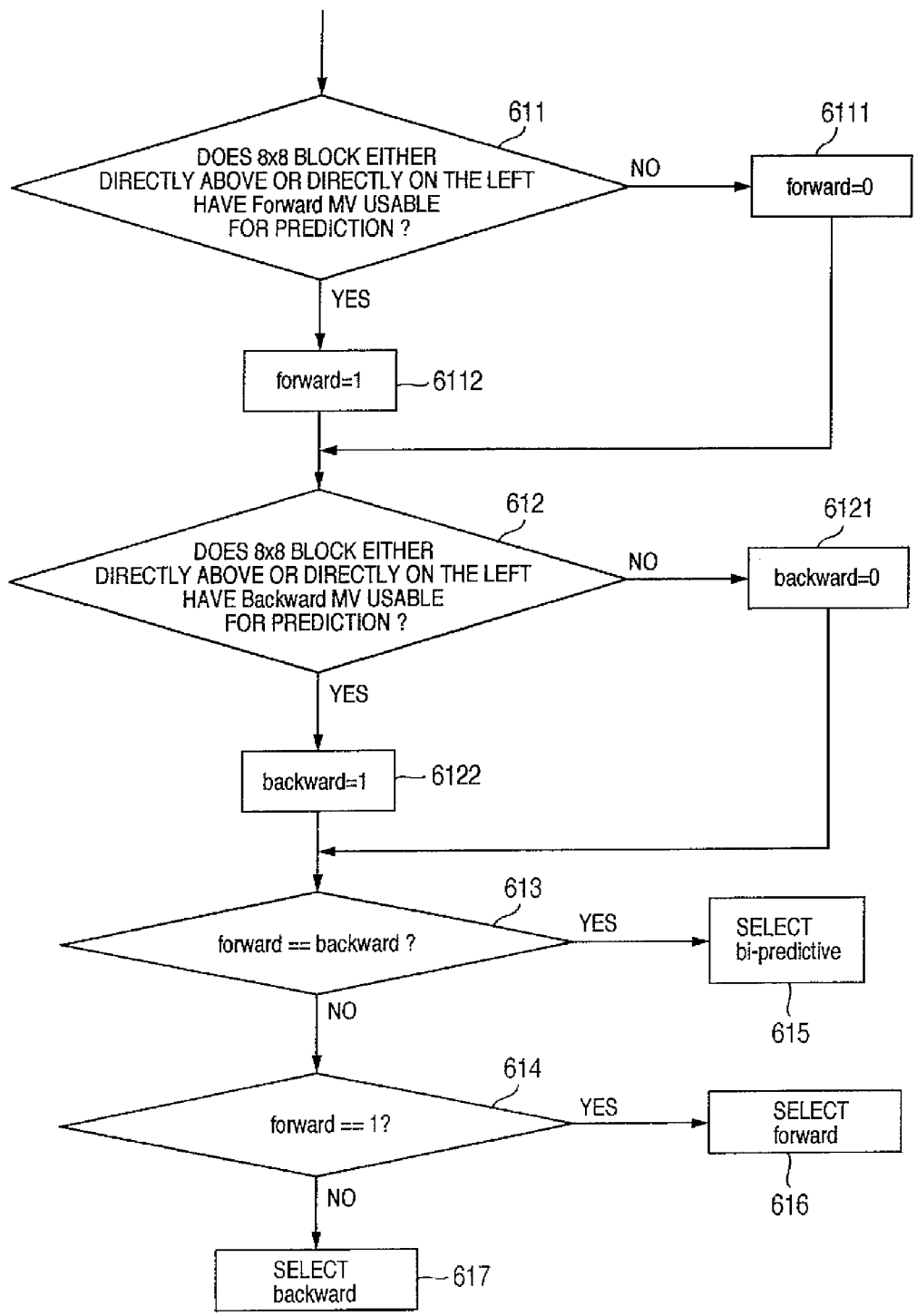
FIG. 15 shows prediction mode selection in the alternative mode according to the present invention.

FIG. 15 shows the procedure to switch prediction methods in the processing step 610. At first, it is checked whether the 8×8 block either directly above or directly on the left has a Forward MV (611). Then, it is checked in the same manner whether the 8×8 block either directly above or directly on the left has a Backward MV (612). When the 8×8 block either directly above or directly on the left has forward MV and backward MV, or when both of the 8×8 blocks directly above and directly on the left do not have forward MV and backward MV, bi-predictive is selected (615). On the other hand, when the 8×8 blocks directly above and directly on the left have only the forward MV respectively, forward MV is selected (616), while when they have only the backward MV respectively, backward MV is selected (617). According to this procedure, the bi-predictive mode with the highest prediction efficiency is preferentially selected. Even when information necessary to perform bi-predictive mode efficiently cannot be obtained from the surrounding blocks, the direction of prediction estimated as optimal based on the information obtained from the surrounding blocks can be selected. Further, even if sufficient information cannot be obtained from the surrounding blocks, control can be done in such a manner to make the selection of the Direct mode more effective than that of the other prediction modes, thus contributing to the improvement of prediction efficiency. Specifically, processing in FIG. 16 and processing in FIG. 17 described below are combined to select the bi-predictive mode for zero vectors using forward and backward reference frames of the index 0 (which most resemble the current frame).

Figure 16:
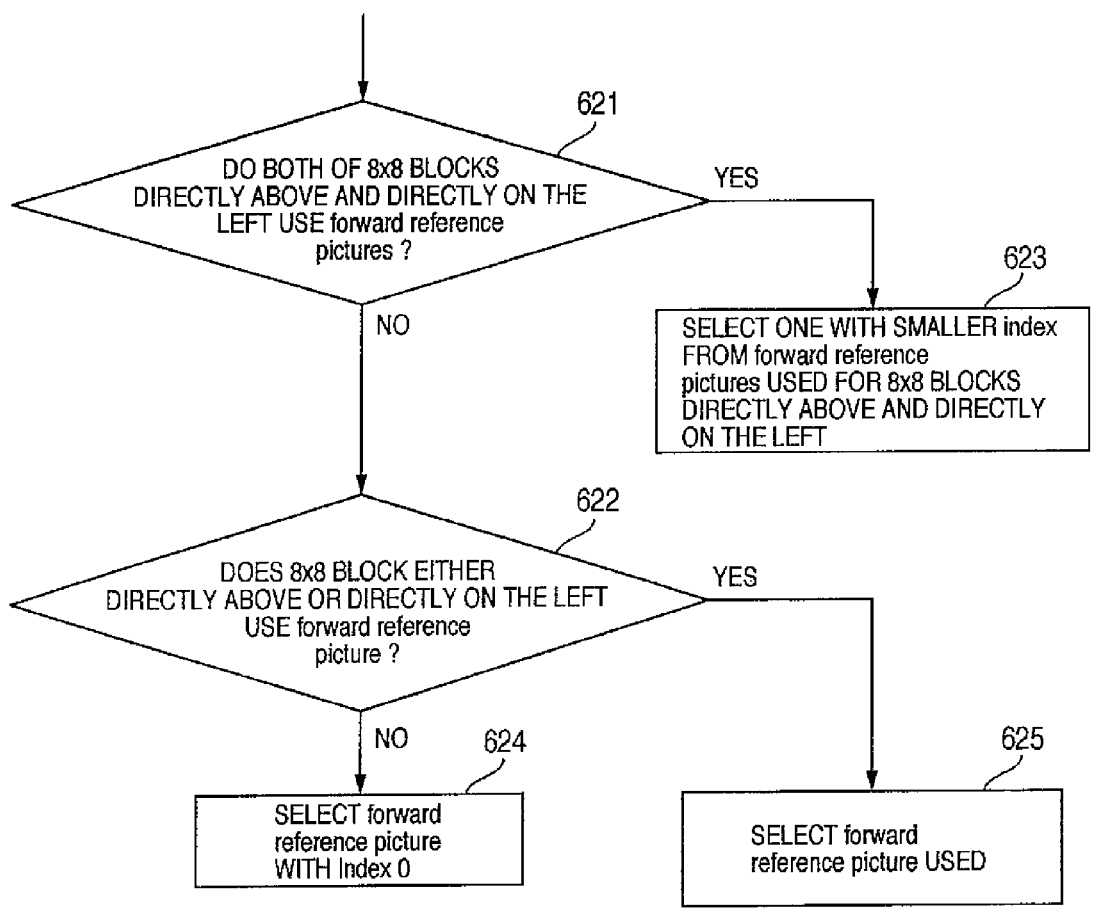
FIG. 16 shows reference frame selection in the alternative mode according to the present invention.

FIG. 16 shows a reference frame selection procedure in the processing step 620. This processing is performed on forward and backward reference frames individually. Although FIG. 16 shows a case of selecting only the forward reference picture, the backward reference picture is selected in the same manner. At first, it is checked whether both of the 8×8 blocks directly above and directly on the left use forward reference pictures (621). When it is determined that both of the 8×8 blocks use forward reference pictures, one of the forward reference pictures used for the two 8×8 blocks is selected based on which index number is smaller (623). On the other hand, when it is determined in the processing step 621 that at least either of the 8×8 blocks does not use a forward reference picture, it is then checked whether the 8×8 block either directly above or directly on the left uses a forward reference picture (622). When it is determined in the processing step 622 that either of the 8×8 blocks uses a forward reference picture, the forward reference picture used is selected (625). On the other hand, when it is determined in the processing step 622 that none of the 8×8 blocks uses a forward reference picture, the index 0 is selected (624). Thus the control is performed to select a smaller value from the Index numbers used for encoding of the adjacent blocks. This control is done based on the fact that smaller index numbers are assigned to frames having higher degrees of similarity to the current frame in the process of setting possible reference frames. The index numbers are set automatically or at the time of encoding. In the former, smaller index numbers are given to frames in the order from the closest frame to the current frame to the farthest from the current frame. The latter case is applied to a moving picture of changing scenes, for example, in such a manner to assign smaller index numbers to frames similar in camera angle to those encoded in the past. Thus the section of smaller index numbers increases the possibility of selecting images similar to the frame to be processed.

Figure 17:
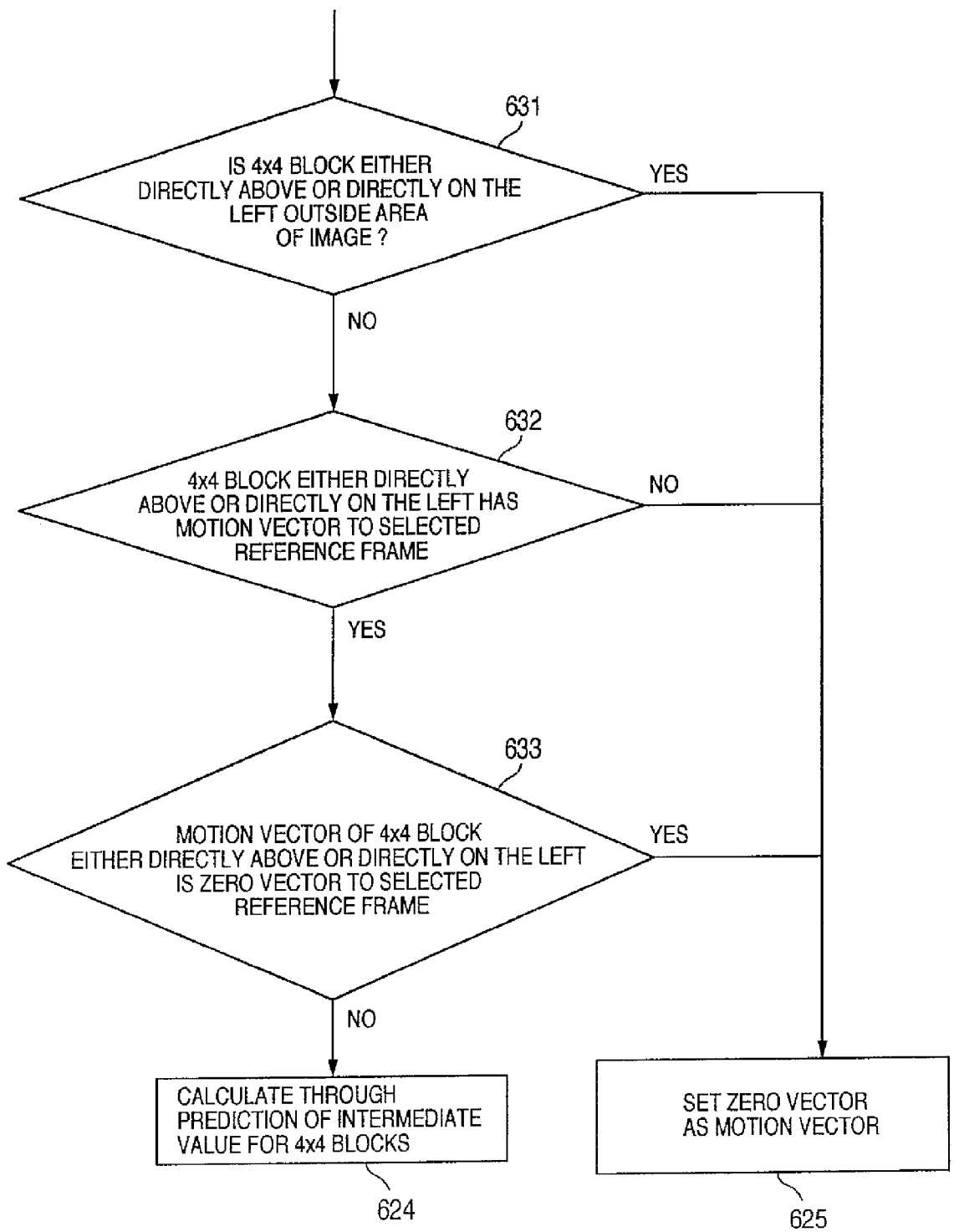
FIG. 17 shows motion vector selection in the alternative mode according to the present invention.

FIG. 17 shows a motion vector calculation procedure in the processing step 630. This processing is performed on forward and backward reference frames in units of 4×4 blocks. At first, it is checked whether either a 4×4 block directly above or a 4×4 block directly on the left is located outside the image (631). When it is determined in the processing step 631 that either of the 4×4 blocks is located outside the image, the motion vector of the 4×4 block is set to be a zero vector (625). On the other hand, when it is determined in the processing step 631 that both of the 4×4 blocks are located inside the image, it is then checked whether the 4×4 block either directly above or directly on the left has a usable motion vector to the reference frame selected in the processing step 620 (632). When it is determined in the processing step 632 that none of the 4×4 blocks has a usable motion vector to the reference frame, the motion vector of the 4×4 block is set to be the zero vector (625). On the other hand, when it is determined in the processing step 632 that either of the 4×4 blocks has a usable motion vector to the reference frame, it is then checked whether either of the motion vectors of the 4×4 blocks directly above and directly on the left is the zero vector to the reference frame selected in the processing step 620 (633). When it is determined in the processing step 633 that the motion vector of either of the 4×4 blocks is the zero vector to the reference frame, the motion vector of the 4×4 block is set to be the zero vector (625). On the other hand, when it is determined in the processing step 633 that none of the motion vectors of the 4×4 blocks is the zero vector to the reference frame, the motion vector is calculated through prediction of an intermediate value for the 4×4 blocks. This priority selection of the zero vector is based on the fact that the Direct mode is particularly effective in the background area.

The present invention includes the following modifications:

(1) In the embodiment, use of the alternative mode is decided depending on the state of the collocated block in the manner shown in FIG. 12, but the direct mode may be fully switched to the alternative mode. In this method, switching between the direct mode and the alternative mode is controlled in the processing step 301 on a frame or slice basis (see modification (4) for details). This increases selection candidates to improve adaptability to scenes with special effects, thereby improving prediction efficiency. However, since this method may perform extrapolation to calculate a motion vector between the reference frame and the current frame, such a switching control method between two modes as shown in FIGS. 12 and 13 is effective under strictly limited conditions on the amount of computation.

(2) The processing shown in FIGS. 14 to 17 is not limited to detailed conditions as long as general principles to create the direction of prediction, the reference frame(s), and the motion vector(s) from the surrounding blocks are the same. For example, the present invention may include a method in which the expression "the 4×4 block either directly above or directly on the left" in the processing step 631 is changed to "both of the 4×4 blocks directly above and directly on the left." The present invention may also include a method in which the number of blocks used for mode selection is changed from two to three (used to create the predicted vector(s)). Such a method that the number of blocks used for mode selection is changed from two to three has excellent consistency with motion vector estimation. Since such consistency results in the improvement of prediction efficiency, this method is effective under the conditions without strict limitations on the amount of computation.

Figure 24:
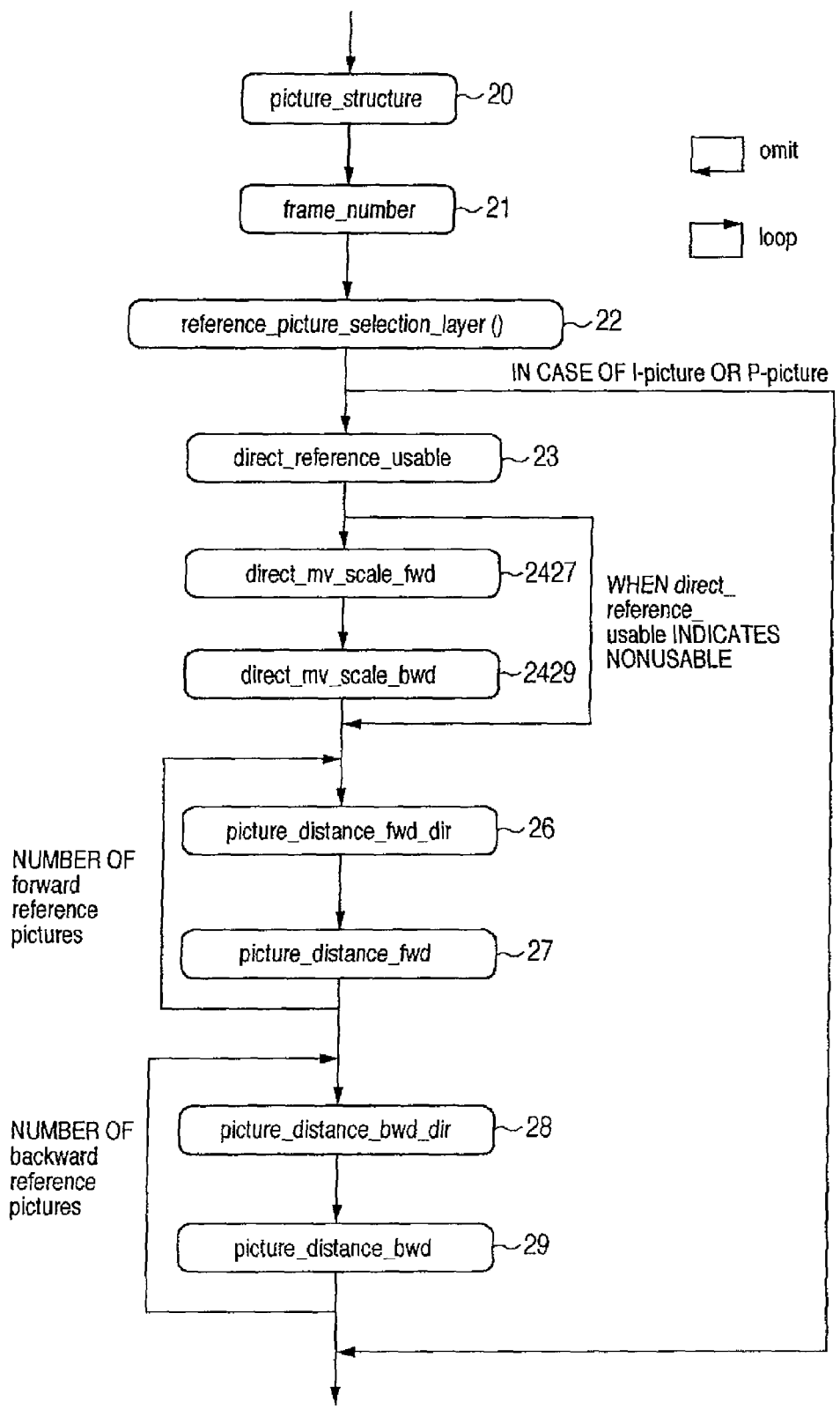
FIG. 24 shows a third example of the data syntax of the picture header according to the present invention.

(3) FIGS. 1 and 2, and FIGS. 12 and 13 shows the methods in which the direct mode is applied regardless of the index number of the forward reference picture to the forward MV as long as the collocated block has the forward MV to the current frame. However, the direct mode tends to lessen its effectiveness as the forward reference picture for the forward MV moves away from the current frame. Therefore, it is effective to use such a method to apply the direct mode only when the index number of the forward reference picture for the forward MV is 0. The following describes this method with reference to FIGS. 24 and 25. FIG. 24 shows the data syntax of the picture layer.

```
picture_layer( )
{
    picture_structure
    frame_number
    reference_picture_selection_layer( )
    if(coding_type( )==B-picture){
        direct_reference_usable
                    if(direct_reference_usable){
                            direct_mv_scale_bwd
                            direct_mv_scale_fwd
                    }
                    for(index=0; index<number of forward reference;
    index++){
                            picture_distance_fwd_dir[index]
                            picture_distance_fwd[index]
                    }
            for(index=0; index<number of backward reference;
    index++){
                            picture_distance_bwd_dir[index]
                            picture_distance_bwd[index]
            }
        }
    }
}
```

The following describes a case where the picture type is B-picture. direct_reference_usable 23 is information indicating that a backward reference frame specified for the direct mode is located in the future relative to the current frame and a forward reference frame specified for the direct mode is located in the past relative to the current frame. The backward reference frame specified for the direct mode is generally a backward reference picture assigned to index 0, and based on this information, it can be clearly determined whether the backward reference picture of the index 0 can be used for the direct mode. On the other hand, the forward reference frame specified for the direct mode is generally a forward reference picture assigned to index 0, and based on this information, it can be clearly determined whether the forward reference picture of the index 0 can be used for the direct mode. If the data 23 is 0, that is, when the backward reference picture of the index 0 is located in the forward direction (past direction) from the current picture or the forward reference picture of the index 0 is located in the backward direction (future direction) from the current picture, the direct mode cannot be performed on the picture. In this case, picture distance information necessary to apply the direct mode does not need encoding/decoding. Therefore, encoding/decoding of direct_mv_scale_fwd 2427, which indicates a time interval between the current picture and the forward reference picture of the index 0, and direct_mv_scale_bwd 2429, which indicates a time interval between the current picture and the backward reference picture of the index 0 are omitted. Data 26 to 29 are data used for motion vector encoding in the bi-predictive mode shown in FIG. 10. The use of these data is described above in FIG. 2 and will not be repeated here. Note that the direct_reference_usable 23 may be information indicating only whether the backward reference frame specified for the direct mode is located in the future relative to the current frame. In this case, information (direct_mv_scale_fwd_dir) indicating the position of the direct_mv_scale_fwd is encoded/decoded before the data 2427. If the forward reference picture is located backward from the current picture in the case of FIG. 9, the two motion vectors 122 and 121 are calculated by extrapolation method.

Figure 25:
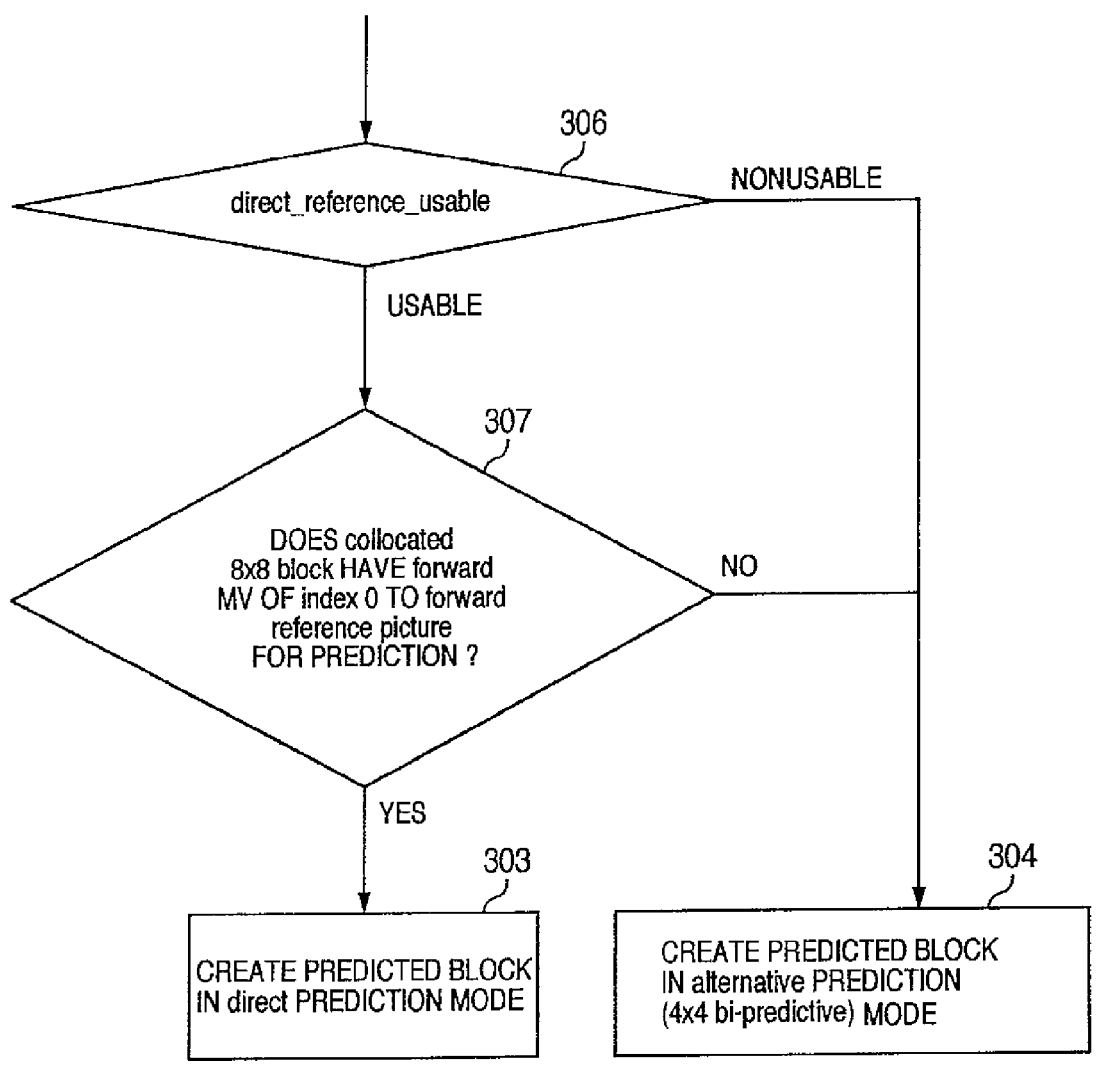
FIG. 25 shows a third example of the switching procedure to switch prediction methods according to the present invention.

Referring next to FIG. 25, handling of the direct mode will be described. As described in FIGS. 12 and 13, even when the direct mode is selected as an option of the mb_skip_run 11 and the mb_type 12, it may not be able to be applied to a system using multiple reference frames or two references frames. Therefore, according to the present invention, a switching procedure to switch prediction methods according to the conditions is used. FIG. 25 shows the procedure. At first, the direct_reference_usable 23 in the picture header is checked to determine whether the direct mode can be used for the current picture (306). If it is determined in the processing step 306 that the direct mode cannot be used, that is, when the forward reference picture of the index 0 is located in the future relative to the current picture or the backward reference picture of the index 0 is located in the past relative to the current picture, a predicted macroblock is created in the alternative mode that requires no forward MV of the collocated block (304). On the other hand, if it is determined in the processing step 306 that prediction method judgment is made in units of 8×8 blocks. Here, the unit is set to 8×8 block because the minimum unit of each reference frame and the selection of prediction direction is 8×8 block in the block partition method of FIG. 7. Specifically, it is checked whether a prediction mode that has a Forward MV is applied to the 8×8 collocated block (307). If it is determined that such a prediction mode is applied, a predicted block is created in the direct mode (303). On the other hand, if it is determined that such a prediction mode is applied, a predicted block is created in the alternative mode (304). In the processing step 307, it is determined that the direct mode cannot be used when the prediction mode is the intra mode or the prediction direction of the collocated 8×8 block is backward, or when the forward reference picture is not the reference picture of the index 0 included in the forward reference picture set for the current picture. Like in FIG. 12, the determination of whether the direct mode can be used or not may also be made in units of macroblocks. In such a case, however, it is determined that the direct mode can be used only when the direct mode is usable for all the prediction blocks in the macroblocks, that is, all the four 8×8 blocks in the block partition method of FIG. 7. As described in FIG. 24, the direct_reference_usable 23 may indicate only whether the forward reference picture of the index 0 is located in the future relative to the current frame. In this case, motion vectors may be calculated in the direct mode using the extrapolation method described in FIG. 24. Further, as shown in the above modification (1), the direct_reference_usable 23 may indicate only the criteria for use of the direct mode. In this case, when use of the direct mode is specified and when the forward reference picture is located in the future or the backward reference picture is located in the future, the motion vectors used in the direct mode of FIG. 9 are also calculated by the extrapolation method.

(4) The description of FIGS. 1 and 2, and FIG. 24 are made on the data structure of the picture header only, but the data structure of the present invention can also be applied to a case where these pieces of information are described in the header of a slice layer as a group of multiple macroblocks.

In such a system that transmits packets of compressed data in units of slices, the procedure for decoding data is decided based on the information in the header of the slice layer. In this case, it is necessary to include, in the slice header, the information of the present invention related to the decoding procedure. Information indicating which macroblocks belong to one slice may be indicated in a communication packet header for control of high-order communication/network related information or the header of a file format, or in a sequence header that defines the entire data structure. A method of switching between the Direct mode and the alternative mode on a slice basis can increase the freedom of choice and hence prediction efficiency compared to the method of switching on a frame basis. This method, however, requires selection control on a slice basis to improve prediction efficiency, resulting in an increase in the amount of computation. Therefore, it can be said that control of switching on a frame basis in the frame structure is effective for use in an application that requires real-time processing.

The methods of the present invention described above can be applied to an image encoder/decoder using a dedicated circuit/chip, and a software image encoder/decoder using a general-purpose processor.

Figure 28:
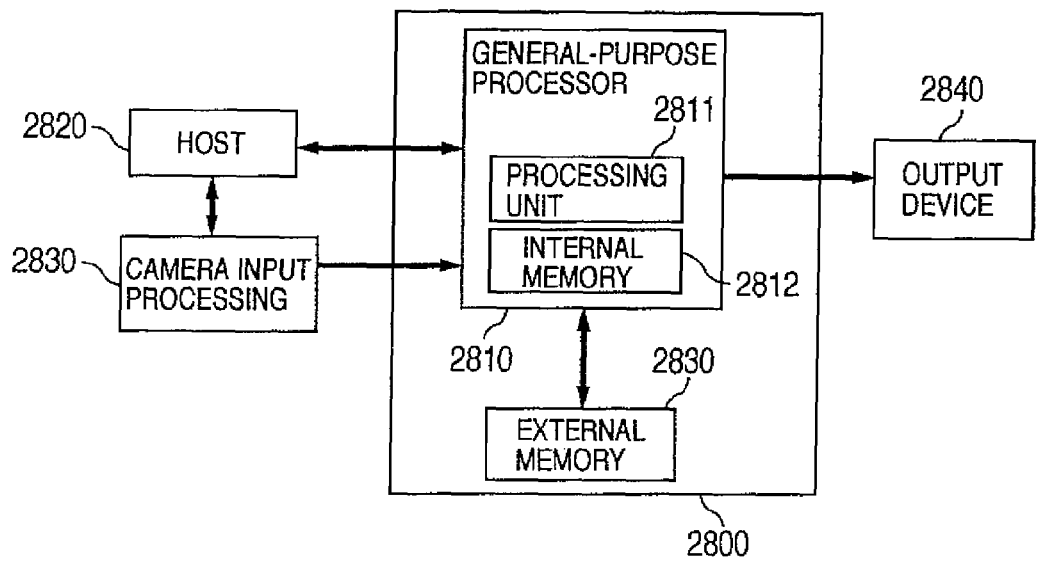
FIG. 28 shows an example of a software encoder that performs the encoding method of the present invention.

FIG. 28 shows a portable terminal using an application processor as an example of a built-in software encoder/decoder. The portable terminal includes a host 2820 that mainly performs radio communication processing, a camera input processor 2830 processing input signals from a camera, an application processor 2800, and an output device 2840 processing display data. Upon encoding, an image photographed with the camera is first converted by the camera input processor 2830 into a YUV signal as shown in FIG. 3, and inputted into the application processor 2800. The application processor 2800 encodes the input image into stream data as shown in FIG. 1 (or FIG. 2 or 24) and FIG. 18. When it is of a built-in type, software (assembler code) that allows a processing unit 2811 in the general-purpose processor 2810 to execute encoding processing (including the operations of FIGS. 14 to 17) is prestored in an internal RAM 2812 or an external RAM 2830. Also preallocated in the internal RAM 2812 or the external RAM 2830 are memory areas for data used in prediction processing as shown in the flowcharts of FIGS. 14 to 17 (such as multiple reference pictures, reference picture numbers for each macroblock, prediction direction, and motion vectors). The arrangement of the memory areas for the assembler code and the data is designed in consideration of balance among processor performance, bus rate, estimated access frequencies to the assembler code or each data, and their data sizes. In general, the internal RAM provides faster access than the external RAM, while the external RAM is larger in capacity than the internal RAM. Therefore, data areas with higher access frequency but of small size, and the assembler code are arranged in the internal RAM. The assembler code may be divided between the internal RAM and the external RAM. The coded bitstream data are stored in the external RAM 2830 or a memory in the host 2820. In other words, they are stored in either the external RAM or the host memory, depending on the services for the portable terminal such as the use of the coded bitstream data. Upon decoding, the bitstream data are supplied from the host 2820 or the external RAM 2830 to the application processor 2800. The application processor 2800 decodes the coded bitstream data inputted, converts the YUV reproduced image into RGB images, and outputs the RGB images to the output device 2840. In this processing, the YUV reproduced image may be temporarily accumulated in a frame memory of the external RAM or internal RAM. Like in the encoding processing, software (assembler code) that allows the processing unit 2811 in the general-purpose processor 2810 to execute decoding processing (including the operations of FIGS. 14 to 17) is prestored in the internal RAM 2812 or the external RAM 2830. Also preallocated in the internal RAM 2812 or the external RAM 2830 are memory areas for data used in prediction processing as shown in the flowcharts of FIGS. 14 to 17 (such as multiple reference pictures, reference picture numbers for each macroblock, prediction direction, and motion vectors).

Figure 29:
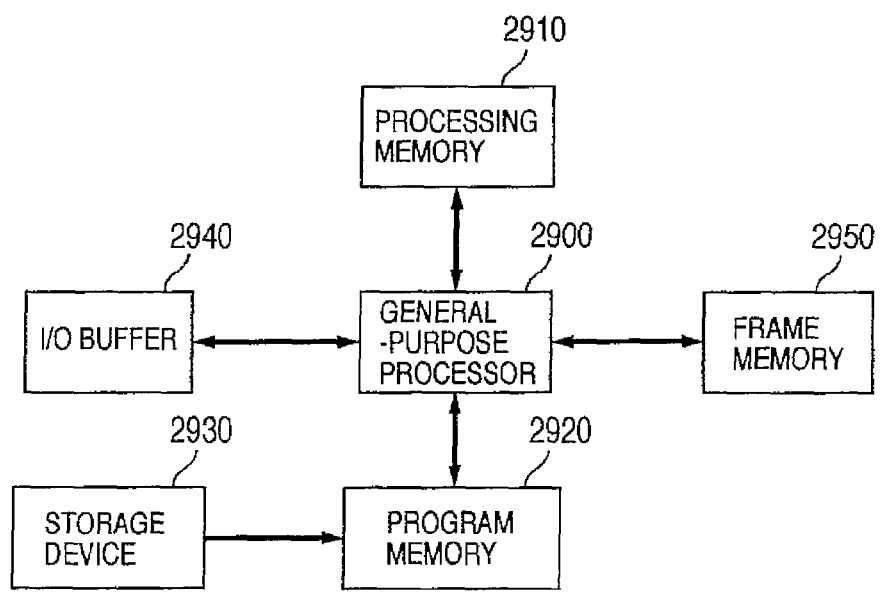
FIG. 29 shows an example of a software decoder that performs the decoding method of the present invention.

FIG. 29 shows an example of a software encoder/decoder for more general purpose use. Upon encoding, an input image is accumulated in a frame memory 2950 from which a general-purpose processor 2900 reads information to execute encoding processing. A program (including the operations shown in the flowcharts of FIGS. 14 to 17) for operating the general-purpose processor is read out of a storage device 2930, such as a hard disk or floppy disk, and stored in a program memory 2920. Coded information outputted from the general-purpose processor is temporarily stored in an I/O buffer 2940, and then outputted as coded bitstreams. Data used in prediction processing as shown in the flowcharts of FIGS. 14 to 17 (such as multiple reference pictures, reference picture numbers for each macroblock, prediction direction, and motion vectors) are stored in a processing memory 2910 from or into which the general-purpose processor reads or stores data according to the program. Upon decoding, a coded bitstream inputted is temporarily stored in the I/O buffer 2940 from which the general-purpose processor reads and decodes the coded bitstream. A program (including the operations shown in the flowcharts of FIGS. 14 to 17) for operating the general-purpose processor is read out of the storage device 2930, such as a hard disk or floppy disk, and stored in the program memory 2920. A decoded image is temporarily stored in the frame memory 2950, and then outputted to an output device. Data used in prediction processing as shown in the flowcharts of FIGS. 14 to 17 (such as multiple reference pictures, reference picture numbers for each macroblock, prediction direction, and motion vectors) are stored in the processing memory 2910 from or into which the general-purpose processor reads the data or stores created data according to the program.

Figure 22:
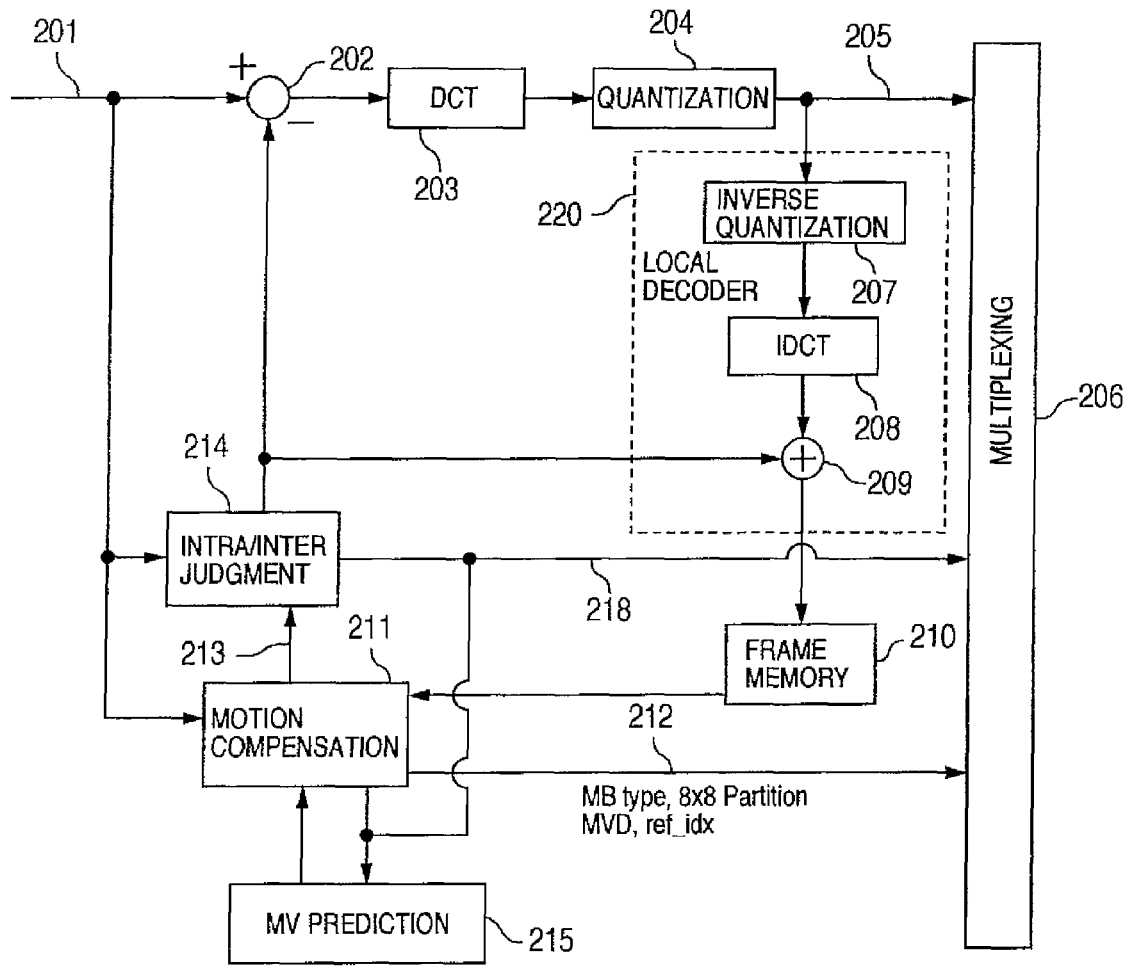
FIG. 22 is a block diagram showing an example of encoding processing according to the present invention.
Figure 26:
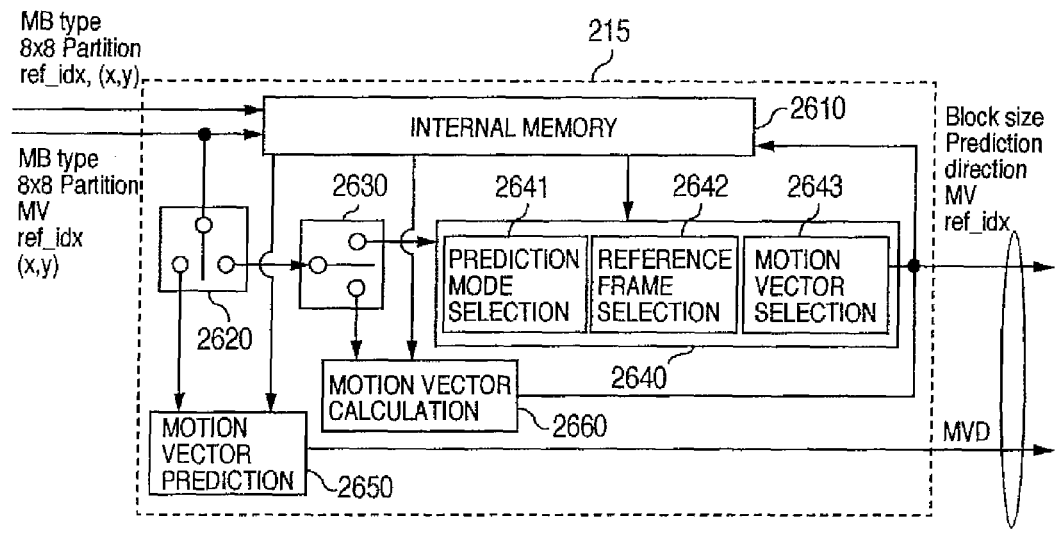
FIG. 26 shows an example of a prediction parameter calculator in an encoder that performs the encoding method of the present invention.

FIG. 22 shows the structure of an image encoder using a dedicated circuit/chip. The following describes the flow of encoding processing for one macroblock. At first, a motion compensator 211 performs motion compensation between an input macroblock image 201 and a decoded image of a coded frame (reference frame) stored in a frame memory 210 for all macroblock types (8×8 Partition type) and all combinations of candidate reference frames to select the optimum macroblock type and 8×8 Partition type. In this case, if the motion compensation is performed in the Direct mode, the motion compensator 211 needs to acquire information on prediction direction, reference frame numbers, and motion vectors from an MV estimator 215. FIG. 26 shows the internal structure of the MV estimator. When the macroblock type (8×8 Partition type) indicating the Direct mode, macroblock position information (block position information), and the type of direct mode (direct/alternative, control by the motion compensator, or the alternative prediction mode indicated in FIGS. 14 to 17) are inputted into the MV estimator, a switcher 2630 is turned on through a switcher 2620. The switcher 2630 switches modes according to the type of direct mode. When the direct mode is of direct predictive type, a motion vector calculator 2660 is activated. The motion vector calculator 2660 calculates prediction parameters shown in FIG. 9 using information stored in an internal memory 2610. The parameters calculated are not only stored in the internal memory, but also notified to the motion compensator. When the direct mode is of alternative predictive type, an alternative estimator 2640 is activated. The alternative estimator 2640 performs processing shown in FIG. 14. Specifically, a prediction mode selector 2641, a reference frame selector 2642, and a motion vector selector 2643 perform processing shown in FIGS. 15, 16, and 17, respectively, using the information stored in the internal memory 2610 to determine the direction of prediction, the reference frame number, and the motion vector. These prediction parameters are not only stored in the internal memory, but also notified to the motion compensator.

Returning to the motion compensator, a motion vector(s) detected after selection of the optimum macroblock type is notified to the MV estimator 215 together with the macroblock type, the prediction direction information (forward/backward/bi-predictive), and the reference frame number(s) to update the contents of the internal memory 2610 (where when the direct mode is selected, only the macroblock type or 8×8 Partition type is updated). For blocks other than those of which the macroblock type and the 8×8 Partition type are not direct, the motion vector estimator 2650 (activated by the switcher 2620) performs prediction processing shown in FIG. 8 to calculate a difference motion vector, respectively. The calculated difference motion vector is outputted to a multiplexer 206 together with the macroblock type, the 8×8 Partition type, and the reference frame number (where when the direct mode is selected, the difference motion vector and the reference frame number are not multiplexed). It is assumed here that the difference motion vector is calculated only for the optimum macroblock type (8×8 Partition type), but the value of the difference motion vector and the amount of encoding may also be used as an evaluation value for selection of the optimum macroblock type (8×8 Partition type). In such a case, the MV estimator calculates a difference motion vector for all the macroblock type (8×8 Partition type) and all combinations of reference frames, respectively.

A predicted macroblock image 213 cut out from the reference frame created through the motion compensation is inputted into an Intra/Inter judgment processor 214. The Intra/Inter judgment processor makes a final decision on which mode, intra or inter, will be the macroblock type, and notifies the multiplexer 206 and the MV estimator 215 of judgment information 218. When the judgment information 218 is the intra mode, the MV estimator 215 updates the data stored in the internal memory. The multiplexer creates a set of codes as shown in FIG. 18, from the Intra/Inter mode judgment result, and the macroblock type, the 8×8 Partition type, the reference frame number, and the difference motion vector obtained from the MV estimator (where when the direct mode is selected, the difference motion vector and the reference frame number are not included), and multiplexed the set of codes into a coded bitstream. When the macroblock type selected by the Intra/Inter judgment processor is the inter mode, the predicted macroblock image is processed by a differentiator 202 so that it will be differentiated from the input macroblock image 201 of the current frame, and a difference macroblock image is created. In this case, the predicted macroblock image is also outputted to an adder 209 at the same time. On the other hand, when the macroblock type selected by the Intra/Inter judgment processor is the intra mode, no predicted macroblock is outputted to the differentiator 202 and the adder 209.

The difference macroblock image outputted from the differentiator 202, or the input macroblock image is first DCT-transformed. Although the block size of DCT is generally an 8×8 block of pixels in the conventional encoding systems, since the transform of 4×4 pixel size has recently been contemplated, such as MPEG-4 Part 10 (Advanced Video Coding), the following describes 4×4 DCT by way of example. As shown in FIG. 6, the difference macroblock image is divided into 4×4 blocks of pixels, and transformed by a DCT transformer 203 into a total of 16 DCT coefficients. Each DCT coefficient is quantized by a quantizer 204, and encoded by the multiplexer 206. The multiplexer 206 multiplexes macroblock data as shown in FIG. 18 with header information as shown in FIG. 1, 2, or 24 to create a coded bitstream. The quantized DCT coefficients are decoded by an inverse DCT transformer 208 into the difference macroblock image or the input macroblock image. When the macroblock prediction mode is the inter mode, the difference macroblock image is added by the adder 209 to the predicted macroblock image, and then synthesized in the frame memory 201. On the other hand, when the macroblock prediction mode is the intra mode, the reconstructed macroblock image is synthesized in the frame memory 201.

Although intra prediction is not performed in the intra mode in FIG. 22, the present invention can also be applied to an encoding mode performing intra prediction. In such a case, the Intra/Inter judgment processor may perform intra prediction, or this processing may be incorporated into the motion compensator. In particular, such an encoding system that provides multiple intra prediction modes, such as MPEG-4 Part 10 (Advanced Video Coding), can handle inter and intra prediction modes concurrently, thereby streamlining the device structure. In such a case, the difference predicted macroblock image 213 is always supplied from the motion compensator 211 to the differentiator 202 and the adder 209. Further, since the judgment information 218 is included in the macroblock type information, the judgment information 218 can be eliminated, and the internal memory updating processing performed by the MV estimator 215 in conjunction with input of the judgment information 218 can also be omitted. In addition, the intra prediction may be performed in the DCT coefficient level. In such a case, the prediction processing can be incorporated into the DCT transformer 203 and the IDCT transformer 208.

Figure 23:
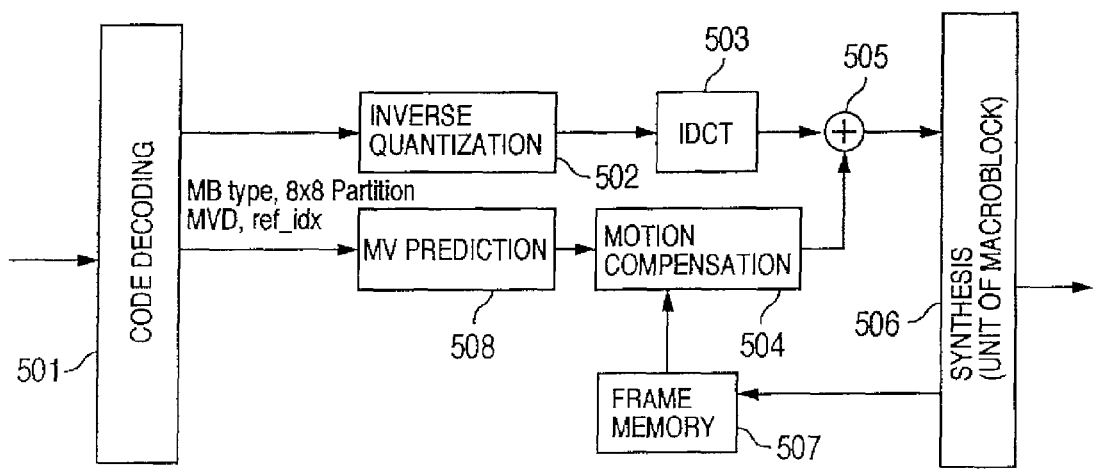
FIG. 23 is a block diagram showing an example of decoding processing according to the present invention.

FIG. 23 shows the structure of an image decoder using a dedicated circuit/chip. The following describes the flow of decoding processing for one macroblock. At first, a code decoder 501 analyzes input coded data, and assigns motion vector related information and macroblock type information to an MV estimator 508, and quantized DCT coefficient information to an inverse quantizer 502.

Figure 27:
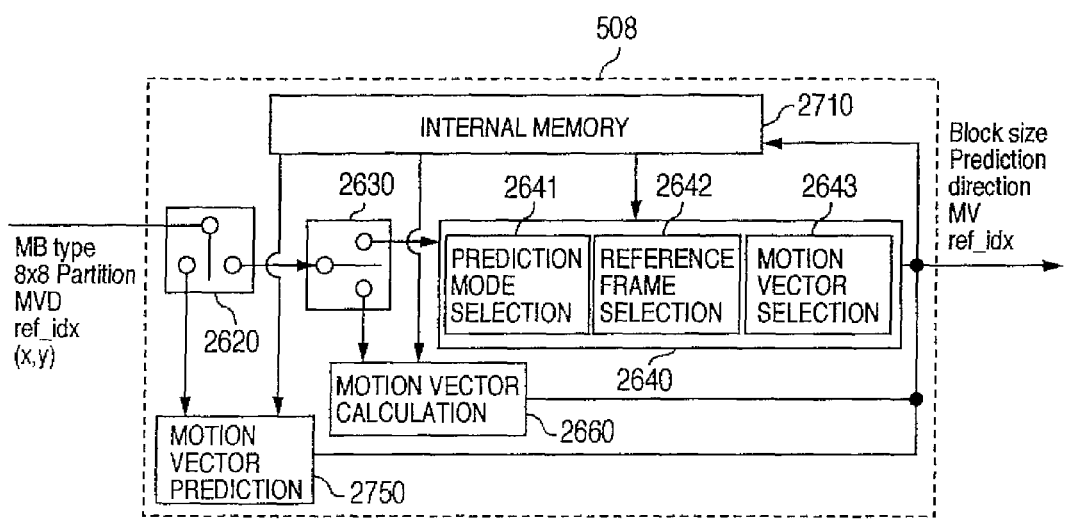
FIG. 27 shows an example of a prediction parameter calculator in a decoder that performs the decoding method of the present invention.

When the macroblock prediction mode is the inter mode, the block position information, the macroblock type, the 8×8 Partition type, the prediction direction information, the reference frame number, and the difference motion vector are inputted into the MV estimator 508 (where when the macroblock type is the direct mode, only the macroblock type and the macroblock position information are inputted, or when the 8×8 Partition type is direct, the reference frame number and the difference motion vector for the 8×8 block are not inputted). FIG. 27 shows the internal structure of the MV estimator. When the macroblock type or 8×8 Partition type is direct, the type of direct mode (direct/alternative, or control by the motion compensator) in slice header information decoded by the code decoder 501 are inputted into the MV estimator together with the macroblock position information and the block position information. In response to input of the macroblock position information (block position information) and the type of direct mode (direct/alternative, or control by the motion compensator), the switcher 2630 is turned on through the switcher 2620. The switcher 2630 switches modes according to the type of direct mode. When the direct mode is of direct predictive type, a motion vector calculator 2660 is activated. The motion vector calculator 2660 calculates prediction parameters shown in FIG. 9 using information stored in an internal memory 2710. The parameters calculated are not only stored in the internal memory, but also notified to the motion compensator 504. When the direct mode is of alternative predictive type, the alternative estimator 2640 is activated. The alternative estimator 2640 performs processing shown in FIG. 14. Specifically, the prediction mode selector 2641, the reference frame selector 2642, and the motion vector selector 2643 perform processing shown in the flowcharts of FIGS. 15, 16, and 17, respectively, using the information stored in the internal memory 2710 to determine the direction of prediction, the reference frame number, and the motion vector. These prediction parameters are not only stored in the internal memory 2710, but also notified to the motion compensator 504. On the other hand, when the macroblock type (8×8 Partition type) is not direct, the macroblock position information (block position information), the reference number, and the difference motion vector are inputted together with the macroblock type (8×8 Partition type). In response to input of the data, the switcher 2620 activates a motion vector predictor 2750. The motion vector predictor 2750 performs prediction processing shown in FIG. 8 using the contents of the internal memory 2710 and the input data to reconstruct the motion vector. The reconstructed motion vector is outputted to the internal memory 2710 and the motion compensator 504 together with the prediction direction information and the reference frame number. The motion compensator 504 creates a predicted macroblock image using the input data and the reference frame stored in a frame memory 507. Next, the inverse quantizer 502 and an inverse DCT transformer 503 perform inverse quantization and inverse DCT on coded data related to a prediction error signal on a 4×4-pixel-block basis, respectively, to reconstruct the difference macroblock image. Then, an adder 505 adds the predicted macroblock image and the difference macroblock image to reproduce the macroblock, and synthesizer 506 synthesizes the reproduced macroblock image with a decoded frame image. The decoded frame image is stored in a frame memory 507 for prediction of the next frame.

When the macroblock type is the intra mode, the inverse quantizer 502 and the inverse DCT transformer 503 perform inverse quantization and inverse DCT on the decoded quantized DCT coefficient information on a 4×4-pixel-block basis, respectively, to reproduce the macroblock image. At this time, the contents of the internal memory 2710 are updated in the intra mode. Although intra prediction is not performed in this figure, the present invention can also be applied to such an encoding system that provides multiple intra prediction modes, such as MPEG-4 Part 10 (Advanced Video Coding). In such a case, the motion compensator 504 has the intra prediction function to always output a predictive macroblock image.

Figure 30:
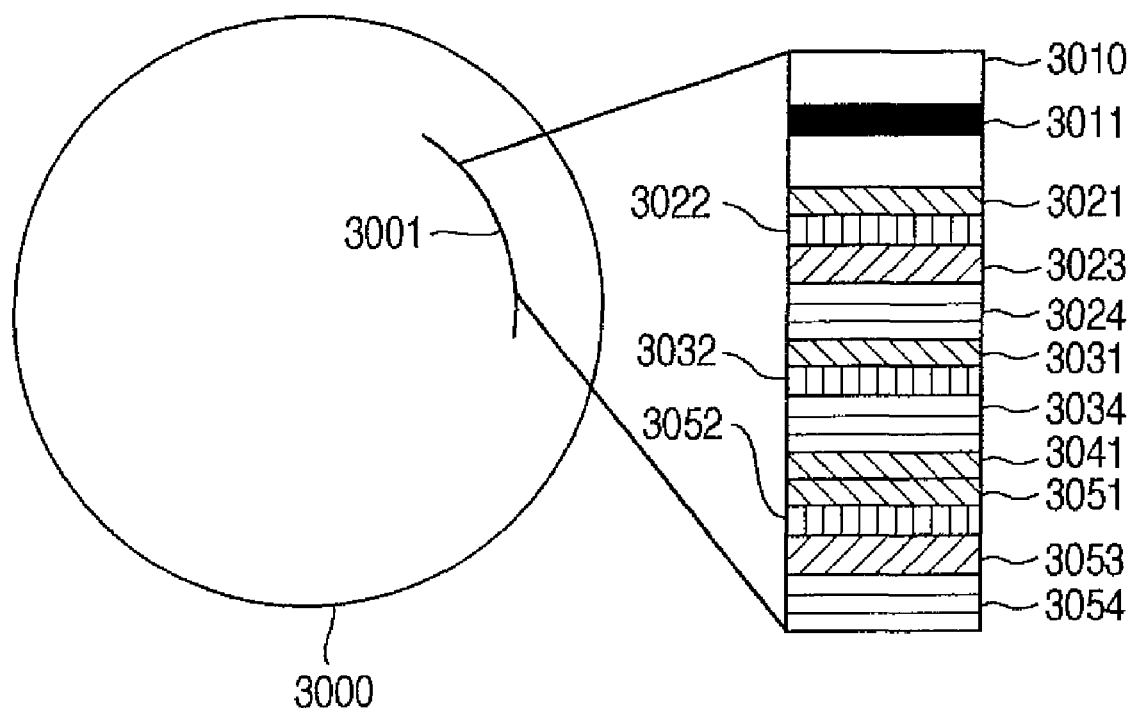
FIG. 30 shows an example of an optical disk on which coded bitstreams created by the encoding method of the present invention are recorded.

FIG. 30 shows an example of a storage medium (recording medium) on which the coded bitstream created by the software encoder (FIGS. 14 to 17) shown in FIGS. 28 and 29 or by the encoder of FIGS. 22 and 26 is recorded. Digital information is recorded concentrically on a recording disk (magnetic disk or optical disk) 3000 capable of recording the digital information. In a part 3001 of the digital information recorded on the disk, slice header information 3010 including direct/alternative mode selection information (direct_reference_usable) 3011, SKIP mode information (mb_skip_run) 3021, 3031, 3041, and 3051, macroblock type information (mb_type, 8×8 partition) 3022, 3032, and 3052, information on reference frame numbers and motion vectors (ref_index_few, ref_index_bwd, mvd_fwd, mvd_bwd) 3023 and 3053, and DCT coefficients and coding block pattern information (CBP, residual( )) 3024 and 3054 are recorded. The following describes the data structure of the slice header when the frame type is B-picture and the direct mode is alternative. 3021 to 3024 and 3051 to 3054 are coded data on macroblocks other than those of which the macroblock type is not Direct. Such a case that at least one 8×8 Partition type includes direct takes the same data structure. In this case, since information on reference frame numbers and motion vectors related to 8×8 blocks of which the 8×8 Partition type is direct is not encoded, these kinds of information are not included in 3023 or 3053. Therefore, upon decoding, the prediction direction, the reference frame number, and the motion vector are calculated as shown in FIGS. 14 to 17 in the case of the software decoder, or by the processing means 2640 of FIG. 27 in the case of the dedicated decoder. A combination of 3031, 3032, and 3035 denotes coded data on macroblocks of which the macroblock type is direct. In this case, the information on reference frame numbers and motion vectors is not encoded. Therefore, upon decoding, the prediction direction, the reference frame number, and the motion vector are calculated as shown in FIGS. 14 to 17 in the case of the software decoder, or by the processing means 2640 of FIG. 27 in the case of the dedicated decoder. 3041 is an example of skip macroblock of which the macroblock type is direct. In this case, there is no DCT coefficient information. Therefore, upon decoding, the prediction direction, the reference frame number, and the motion vector are calculated as shown in FIGS. 14 to 17 in case of the software decoder, or by the processing means 2640 of FIG. 27 in case of the dedicated decoder, and a predicted macroblock image synthesized from these data is used as it is as a reproduced macroblock image. Thus, since the codes indicating that the macroblock type is the direct mode are embedded on the storage medium efficiently, a reproduced macroblock image can be synthesized from a smaller amount of information.

Figure 31:
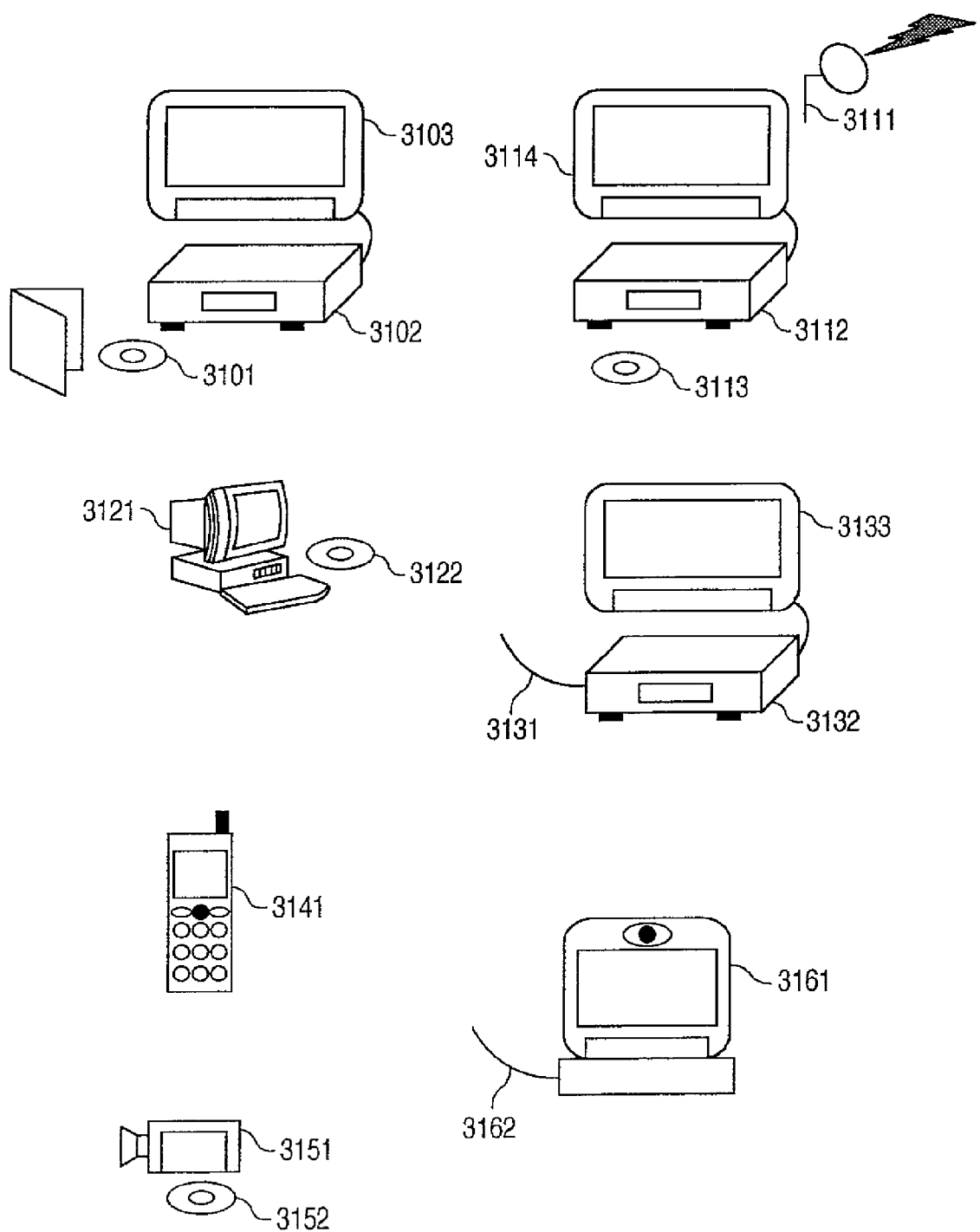
FIG. 31 shows specific examples of devices in which the encoding/decoding method of the present invention is used.

FIG. 31 shows specific examples of devices for implementing the encoding/decoding method of the present invention.

The decoding method of the present invention can be loaded into a reproduction device 3102 that reads and decodes coded bitstreams recorded on an optical disk 3101 (DVD-ROM, DVD-R, BD-ROM or Blue-ray Disc, ROM, CD-ROM/CD-R, etc.) as a recording medium. In this case, the reproduced picture signal is displayed on a TV monitor 3103.

The coding method of the present invention can be loaded into a recording/reproduction device 3112 that encodes ground-based or satellite digital broadcasting programs received via an antenna 3111 to record coded bitstreams on an optical disk 3113 (DVD-RAM, DVD-RW, BD-RAM, CD-RW, etc.). The decoding method of the present invention can also be loaded into the recording/reproduction device 3112 that decodes the coded bitstreams recorded on the optical disk 3113. In this case, the reproduced picture signal is displayed on a TV monitor 3114.

A software program for the image encoding/decoding method of the present invention can also be installed on a computer 3121 so that the computer will function as an image encoder/decoder. The software program is recorded on any kind of storage medium 3122 (optical disc, floppy disk, hard disk, etc.) as a computer-readable recording medium. The personal computer reads and uses the software program. Further, the personal computer can be connected to any communication line so that it can be used as a video communication terminal.

Further, the decoding method of the present invention can be loaded into a decoder in a set-top box 3132 connected to a cable 3131 for cable TV or an antenna for satellite or ground-based digital broadcast so that digital broadcasting programs will be replayed on a TV monitor 3133. The decoding method of the present invention may be incorporated into a decoder in the TV monitor, rather than in the set-top box.

Furthermore, a device including the encoding/decoding method of the present invention or the software encoder/decoder of the present invention can be mounted in a digital portable terminal 3141. There are three mounting forms: a two-way terminal having both the encoding method and decoding method, a transmitter terminal having the decoding function only, and a receiver terminal having the decoding function only.

Furthermore, the encoding/decoding method of the present invention can be incorporated into a video camera 3151. In this case, the video camera includes a decoder and a recorder for recording output of the decoder on a recording medium. The recorder records, on the recording medium, coded bitstreams outputted from the coder. If the above portable terminal has a camera, photographed images can be encoded and transmitted through the antenna.

Furthermore, the encoding/decoding method of the present invention can be incorporated into a video conferencing system 3161 having a camera input. A picture inputted from the camera is encoded at an encoder into a coded bitstream and distributed to a network 3162. The coded bitstream received from the network is decoded at a decoder and displayed on a monitor. In this case, means for implementing the encoding/decoding method of the present invention may be a software encoder/decoder rather than the encoder/decoder.

The encoding/decoding method of the present invention can be incorporated in the above-mentioned devices in such a manner to make an effective use of the direct mode and the alternative mode, thereby improving predictability.

The header information according to the present invention makes it possible to clearly determine whether the direct mode can be used or not. Further, when the frame number has no time information, information indicating the relationship between the reference frame and the current frame can be sent efficiently. In addition, the alternative mode and the switching procedure to switch to the alternative mode make it possible to improve predictability even if the direct mode cannot be applied.

INDUSTRIAL APPLICABILITY

The present application can be applied to encoding/decoding of moving pictures.

The invention claimed is:

1. A moving picture decoding method, carried out by computing system, including a prediction mode, in which prediction mode motion vector information of a current block in a current frame is not transmitted from an encoding side, comprising:
    in said prediction mode:
    selecting one reference frame from among a plurality of candidate reference frames including: a reference frame referenced by one or a plurality of adjacent blocks within a current frame and adjacent to a current block; and a prescribed reference frame not based on the reference frame referenced by the adjacent blocks, as the reference frame to be used in the prediction mode;
    determining a motion vector to be used in the prediction mode; and
    performing prediction processing using the selected reference frame and the determined motion vector.

* * * * *

UNITED STATES PATENT AND TRADEMARK OFFICE
CERTIFICATE OF CORRECTION

| | |
|---|---|
| PATENT NO. | : 7,936,823 B2 |
| APPLICATION NO. | : 11/932110 |
| DATED | : May 3, 2011 |
| INVENTOR(S) | : Suzuki |

It is certified that error appears in the above-identified patent and that said Letters Patent is hereby corrected as shown below:

On the title page:

Item (73), should read as follows:

Assignee: Hitachi Consumer Electronics Co., Ltd., Tokyo (JP)

Signed and Sealed this
Sixteenth Day of August, 2011

David J. Kappos
*Director of the United States Patent and Trademark Office*